US010092966B2

(12) United States Patent
Parks et al.

(10) Patent No.: US 10,092,966 B2
(45) Date of Patent: Oct. 9, 2018

(54) DIES FOR THREADED ROD CUTTING MACHINE

(71) Applicant: BLACK & DECKER INC., New Britain, CT (US)

(72) Inventors: James R. Parks, White Hall, MD (US); Richard J. Heavel, Hanover, PA (US); Michael J. Schaub, Nottingham, MD (US); Robert G. Kusmierski, York, PA (US)

(73) Assignee: BLACK & DECKER INC., New Britain, CT (US)

( * ) Notice: Subject to any disclaimer, the term of this patent is extended or adjusted under 35 U.S.C. 154(b) by 146 days.

(21) Appl. No.: 15/078,028

(22) Filed: Mar. 23, 2016

(65) Prior Publication Data
US 2017/0021435 A1    Jan. 26, 2017

Related U.S. Application Data

(63) Continuation-in-part of application No. 14/511,897, filed on Oct. 10, 2014.

(51) Int. Cl.
*B23D 35/00* (2006.01)
*B23D 21/00* (2006.01)
(Continued)

(52) U.S. Cl.
CPC .......... *B23D 35/001* (2013.01); *B23D 17/04* (2013.01); *B23D 21/00* (2013.01); *B23D 29/002* (2013.01)

(58) Field of Classification Search
CPC ...... B23D 15/14; B23D 21/00; B23D 29/002; B23D 35/001
See application file for complete search history.

(56) References Cited

U.S. PATENT DOCUMENTS 1,976,878 A    10/1934 Eden
3,103,245 A    9/1963 Iskyan
(Continued)

FOREIGN PATENT DOCUMENTS

DE    9421047 U1    7/1995
DE    19515955 A1 *  11/1995
(Continued)

OTHER PUBLICATIONS

Hamel, Pascal—Communication Pursusant to Article 94(3) EPC—Jan. 2, 2018—7 pages—European Patent Office—Netherlands.
(Continued)

*Primary Examiner* — Stephen Choi
(74) *Attorney, Agent, or Firm* — Scott B. Markow

(57) ABSTRACT

First and second dies can be coupled to a pair of arms on a threaded rod cutting machine. The first die has a body with a front face, a rear face, a side face extending between the front face and the rear face, and a first threaded recess in the first side face and configured to receive a threaded rod to be cut. Crests and troughs of the first thread are aligned with troughs and crests of the threaded rod when the first die engages the rod. The second die has a body with a front face, a side face extending between the front face and the rear face, and a second threaded recess in the side face and configured to receive the threaded rod. Crests and troughs of the second thread are axially offset from troughs and crests of the threaded rod when the second die engages the rod.

20 Claims, 26 Drawing Sheets

(51) Int. Cl.
*B23D 29/00* (2006.01)
*B23D 17/04* (2006.01)

(56) References Cited

U.S. PATENT DOCUMENTS

| | | | |
|---|---|---|---|
| 3,602,057 | A | 8/1971 | McEntire |
| 3,988,827 | A | 11/1976 | Sakamoto et al. |
| 4,825,682 | A | 5/1989 | Orav et al. |
| 5,457,889 | A | 10/1995 | Kimura |
| 5,537,902 | A | 7/1996 | Kimura et al. |
| 5,671,892 | A | 9/1997 | Morikawa et al. |
| 5,802,908 | A | 9/1998 | Frenken |
| 5,873,784 | A | 2/1999 | Iwasaki et al. |
| 5,931,039 | A | 8/1999 | Yoshimizu et al. |
| 5,974,926 | A | 11/1999 | Kimura |
| 6,026,668 | A | 2/2000 | Oda et al. |
| 6,088,860 | A | 7/2000 | Poehlmann et al. |
| 6,305,041 | B1 | 10/2001 | Montague et al. |
| 6,435,068 | B1 | 8/2002 | Stuckart |
| 6,485,394 | B1 | 11/2002 | Minegishi et al. |
| 6,625,832 | B2 | 9/2003 | Montague et al. |
| 6,725,546 | B1 | 4/2004 | Dallas et al. |
| 7,020,967 | B2 | 4/2006 | Kimura |
| D522,339 | S | 6/2006 | Kimura |
| 7,111,541 | B2 | 9/2006 | Kimura |
| 7,284,330 | B2 | 10/2007 | Wagner |
| 7,845,080 | B2 | 12/2010 | Nasiell |
| 8,266,991 | B2 | 9/2012 | Thorson et al. |
| 8,671,579 | B2 | 3/2014 | Frenken |
| 8,753,082 | B2 | 6/2014 | Fuglsang-Petersen et al. |
| 8,763,257 | B2 | 7/2014 | Thorson et al. |
| 2001/0018778 | A1 | 9/2001 | Montague et al. |
| 2002/0023302 | A1 | 2/2002 | Montague et al. |
| 2004/0019974 | A1 | 2/2004 | Montague et al. |
| 2007/0033812 | A1 | 2/2007 | Kimura |
| 2008/0000091 | A1 | 1/2008 | Eriguchi |
| 2009/0165306 | A1 | 7/2009 | Nasiell |
| 2013/0008031 | A1 | 1/2013 | Thorson et al. |
| 2014/0128213 | A1 | 5/2014 | Walliser et al. |
| 2016/0101477 | A1 | 4/2016 | Parks et al. |
| 2017/0021435 | A1 | 1/2017 | Parks et al. |

FOREIGN PATENT DOCUMENTS

| | | | |
|---|---|---|---|
| DE | 19714451 | A1 | 9/1997 |
| EP | 0881022 | A1 | 12/1998 |
| JP | 61038814 | | 2/1986 |
| JP | 63127810 | | 5/1988 |
| JP | 63245323 | | 10/1988 |
| JP | 63295111 | | 12/1988 |
| JP | 1135410 | | 5/1989 |
| JP | 1135411 | | 5/1989 |
| JP | 1135412 | | 5/1989 |
| JP | 2307640 | | 12/1990 |
| JP | 6015520 | | 1/1994 |
| JP | 6297232 | | 10/1994 |
| JP | 6297233 | | 10/1994 |
| JP | 7299641 | | 11/1995 |
| JP | 8112717 | | 5/1996 |
| JP | 8174329 | | 7/1996 |
| JP | 8174330 | | 7/1996 |
| JP | 8174331 | | 7/1996 |
| JP | 8267311 | | 10/1996 |
| JP | 8267313 | | 10/1996 |
| JP | 10202418 | | 8/1998 |
| JP | 11285917 | A | 10/1999 |
| JP | 2001179530 | A | 7/2001 |
| JP | 2003089011 | A | 3/2003 |
| JP | 2004122311 | A | 4/2004 |
| JP | 2004122312 | A | 4/2004 |
| JP | 2004291134 | A | 10/2004 |
| JP | 2004299007 | A | 10/2004 |
| JP | 2005238355 | A | 9/2005 |
| JP | 2008173726 | A | 7/2008 |
| JP | 2010280011 | A2 | 12/2010 |
| JP | 2013132743 | A2 | 7/2013 |
| WO | 200110610 | A1 | 2/2001 |
| WO | WO-2008046973 | A1 * | 4/2008 |

OTHER PUBLICATIONS

Rilliard, Arnaud—Extended European Search Report re: related European Patent Appln. No. 17157956—Aug. 9, 2017—13 pages—The Hague.

Stainlec—printout from website: www.stainelec.co.au—Kamekura DW-404 Stainless Steel Threaded Rod Cutter—date unknown—2 pages.

Stainlec—printout from website: www.stainelec.co.au—Ogura HWC-634 Cordless Threaded Rod Cutter—date unknown—1 page.

Makita Corp.—printout from website: http://www.makita.co.jp/product/li_ion/sc101drf/sc101drf/html—printed Jan. 21, 2014—4 pages.

Hitachi Koki Co., Ltd—printout from website: http://www.hitachi-koki.com/powertools/products/li_ion/cl14dsl/cl14dsl.html—14.4V Stud Cutter—printed Jan. 21, 2014—2 pages.

Hitachi Koki Co., Ltd.—Power Tools Catalog 2014-2015—3 pages.

Hamel, Pascal—Extended European Search Report re: corresponding European Patent Application No. 15199079—Feb. 8, 2016—9 pages.

* cited by examiner

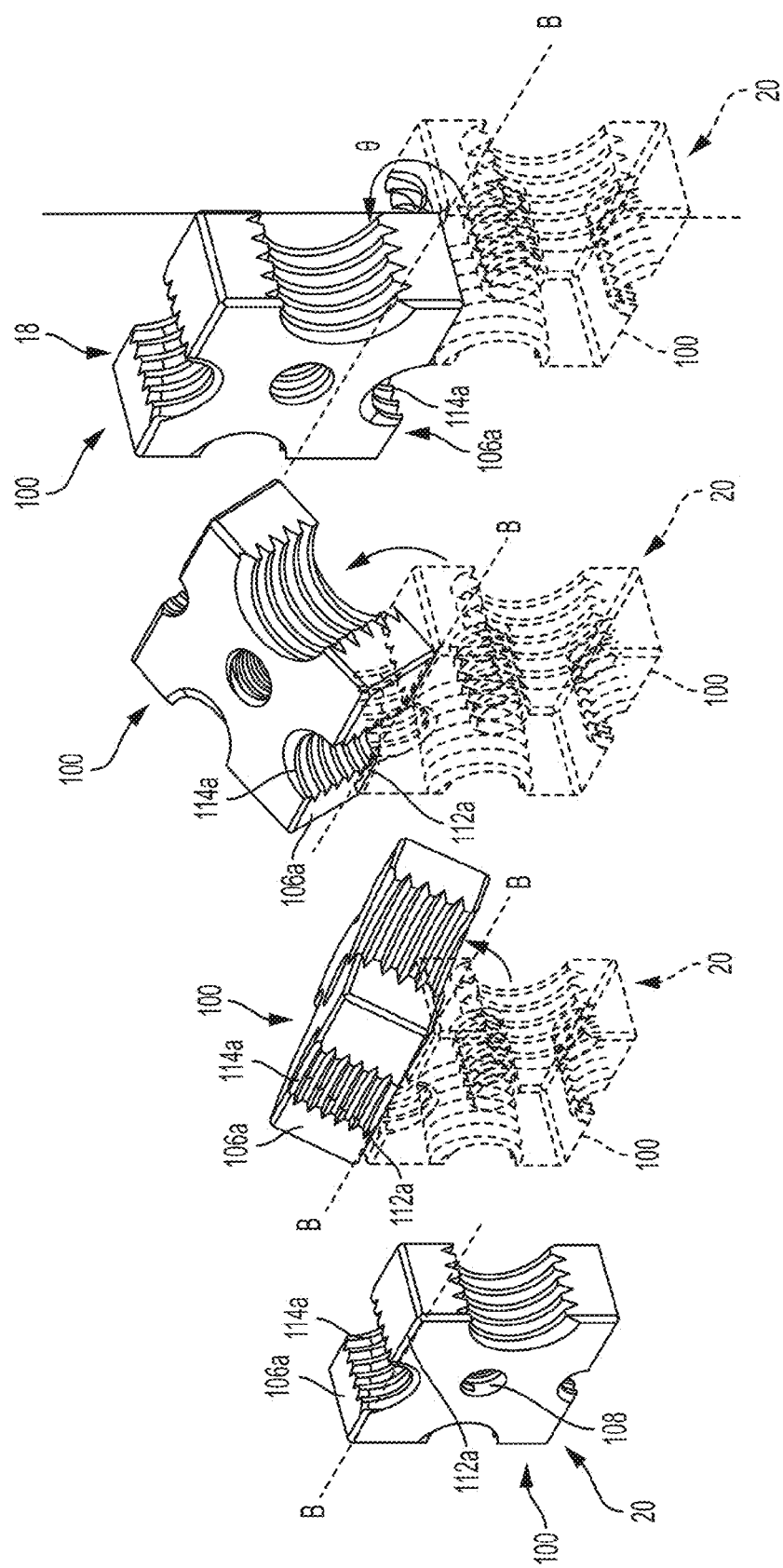

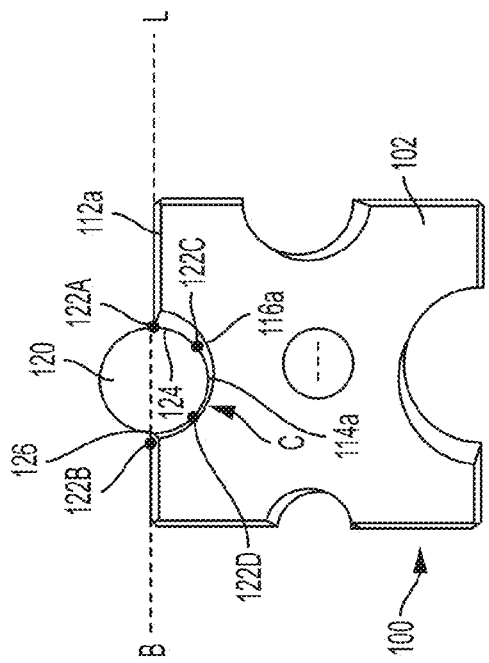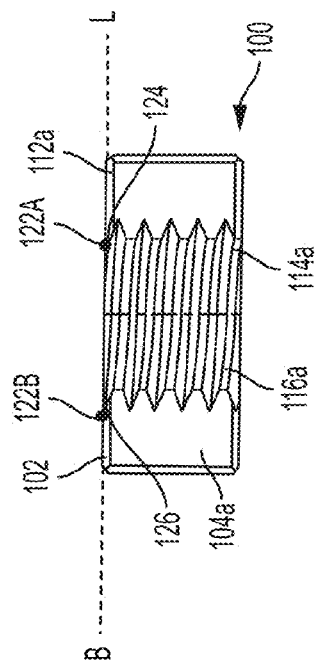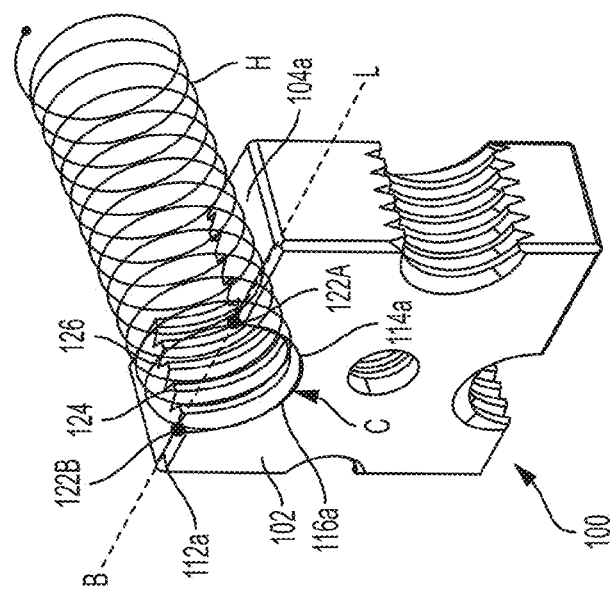

DIES FOR THREADED ROD CUTTING MACHINE

RELATED APPLICATIONS

This application is a continuation in part of U.S. patent application Ser. No. 14/511,897, filed Oct. 10, 2014, titled "Dies for Threaded Rod Cutting Machine," which is incorporated by reference.

TECHNICAL FIELD

This application relates to dies for a machine used to cut threaded rods.

BACKGROUND

A machine for cutting threaded rods is shown, for example, in Japanese Patent Publication No. 06-297232, published on Oct. 25, 1994, which is incorporated by reference. This threaded rod cutting machine includes a fixed die with a cutting edge 15 and a moveable die with the cutting edge 21 coupled to a swinging member 23. Rotation of a motor 3 causes a rotation of a cam 19 and the swinging member 23 in a clockwise direction to cause the cutting edges 15, 21 to cut a threaded rod 33 by a shearing action. The motor 3 continues to rotate even after the rod is cut, and a pin 19 of the cam 19 engages with a first arm part 23 of a return plate 27 to forcibly rotate the swinging member. This causes the moveable cutting edge 21 to separate from the fixed cutting edge 15 by the force of a spring 30.

The dies for such a machine are generally removable and replaceable. Each die has a recess for receiving the threaded rod that has a size to match that of the threaded rod. The dies may be interchanged with other dies having different sized recesses for receiving threaded rods of different sizes. The fixed and moveable dies generally are not interchangeable with each other. Rather, the fixed die can only be attached only in the fixed position and the moveable die can only be attached in the moveable position. This requires two unique dies to be manufactured and sold for each size threaded rod to be cut.

SUMMARY

In an aspect, a pair of dies is configured to be coupled to a machine for cutting threaded rods, the machine having a pair of arms each configured to hold one of the dies, at least one of the arms being moveable relative to the other arm to cause the dies to shear a threaded rod. Each of the dies includes a body having a front face, a rear face, a side face extending between the front face and the rear face. A cutting edge is at a junction between the side face and the front face. A threaded arcuate recess is defined in the side face and is configured to receive a portion of a threaded rod to be cut. The dies are substantially identical so the dies can be reversibly attached in either of the arms.

Implementations of this aspect may include one or more of the following features. The arcuate recess in each die may include a thread with a starting point, the starting point of the thread of each die being configured such that the dies form a continuous helical path about a threaded rod to be cut when the dies are closed around the threaded rod. The starting point for the thread in each die may be a theoretical starting point or an actual starting point. The starting point of the thread for each die may be at a junction between the cutting edge and the arcuate recess. The starting point for each thread of each die may substantially coincide with a line that bisects a threaded rod to be cut when the dies are closed around the threaded rod. The starting points of the thread in each of the dies may substantially coincide with each other when the dies are closed around a threaded rod to be cut.

Each of the dies may include a fastener receiver configured to be coupled to a fastener for coupling the die to one of the arms, the fastener receiver being configured so that the fastener may only be coupled to the fastener receiver at the rear face of the die. The fastener receiver for each die may include a through bore extending from the rear face to the front face, the bore being threaded with a thread that starts at the rear face but does not extend to the front face so that a threaded fastener may only be inserted into the bore from the rear face. Each of the dies may have a polyhedral shape (e.g., a prismatic polyhedron, a polyhedron with flat sides and/or straight edges, or a polyhedron with curved sides and/or edges). The side face of each die may comprise a plurality of side faces extending between the front face and the back face, each of the side faces defining a threaded arcuate recess, at least two of the threaded arcuate recesses of each die having different sizes from each other for receiving different sizes of threaded rods.

In another aspect, a pair of dies is configured to be coupled to a machine for cutting threaded rods, the machine having a pair of arms each configured to hold one of the dies, at least one of the arms being moveable relative to the other arm to cause the dies to shear a threaded rod. Each of the dies includes a body having a front face, a rear face, a side face extending between the front face and the rear face. A cutting edge is at a junction between the side face and the front face. A threaded arcuate recess is defined in the side face and configured to receive a portion of a threaded rod to be cut. Each threaded recess includes a thread having a starting point positioned relative to a circumference of the recess such that the dies are reversibly attached to either of the arms with the threads of the dies forming a continuous helical path about a threaded rod to be cut when the dies are closed around the threaded rod.

Implementations of this aspect may include one or more of the following features. The starting point of the thread for each die may coincide with a line that bisects a threaded rod to be cut when the dies are closed around the threaded rod. The starting point for the thread of each die may be a theoretical starting point or an actual starting point. The starting point for the thread of each die may be at a junction between the cutting edge and the arcuate recess. Each die may include a through bore extending from the rear face to the front face, the bore being threaded with a thread that starts at the rear face but does not extend to the front face so that a threaded fastener may only be inserted into the bore from the rear face. The side face of each die may comprise a plurality of side faces extending between the front face and the back face, each of the side faces defining a threaded arcuate recess, at least two of the threaded arcuate recesses of each die having different sizes from each other for receiving different sizes of threaded rods.

In another aspect, a pair of dies is configured to be coupled to a machine for cutting threaded rods, the machine having a pair of arms each configured to hold one of the dies, at least one of the arms being moveable relative to the other arm to cause dies held by the arms to shear a threaded rod. Each of the dies includes a body having a front face, a rear face, and a plurality of side faces extending between the front face and the rear face. A cutting edge is at a junction between each of the side faces and the front face. A threaded arcuate recess is defined in each of the side faces and configured to receive a portion of a threaded rod to be cut. At least two of the threaded arcuate recesses have different sizes from each other for receiving different sizes of threaded rods. The dies are attachable to the arms in different rotational positions so that the at least two different sized threaded arcuate recesses of each die can be positioned to face each other and receive different sizes of threaded rods. In one implementation, the dies may be reversibly attachable to either the first arm or the second arm.

In another aspect, a set of dies is configured to be coupled to a machine for cutting threaded rods. A first die has a first body with a first front face, a first rear face, a first side face extending between the first front face and the first rear face, and a first threaded arcuate recess with a first thread defined in the first side face and configured to receive a portion of a first threaded rod to be cut. Crests and troughs of the first thread are aligned with troughs and crests of a thread of the first threaded rod when the first die engages the first threaded rod. A second die has a second body with a second front face, a second side face extending between the second front face and the second rear face, and a second threaded arcuate recess with a second thread defined in the second side face and configured to receive a portion of the first threaded rod to be cut. Crests and troughs of the second thread are axially offset from troughs and crests of the thread of the first threaded rod when the second die engages the first threaded rod.

Implementations of this aspect may include one or more of the following features. The crests and troughs of the second thread may bias the second die toward the first die when cutting the first threaded rod. The first thread may have a first trough starting point in a plane of the first front face and the second thread may have a second trough starting point in a plane of the second front face. The first and second trough starting points may be located such that the first and second threads form a discontinuous helical path when the first and second dies are closed around the first threaded rod. The first trough may have a starting point that is spaced from the first die at a first acute angle in a counter-clockwise direction relative to a first radius that extends outward from the first side face and bisects the first recess. The second starting point may be located at a second acute angle in a counter-clockwise direction relative to a second recess that extends outward from the second side face and bisects the second recess. The first angle may be approximately equal to the second angle so that the first die is interchangeable with the second die. The first angle and the second angle may each be approximately 50° to approximately 60°. The first die may be configured to be stationary while cutting a threaded rod, and the second die may be configured to be moveable while cutting a threaded rod.

The first die may include a third side face extending between the first front face and the first rear face, and a third threaded arcuate recess with a third thread defined in the third side face and configured to receive a second threaded rod to be cut. Crests and troughs of the third thread may be aligned with troughs and crests of a thread of the second threaded rod when the first die engages the second threaded rod. The second die may include a fourth side face extending between the second front face and the second rear face, and a fourth threaded arcuate recess with a fourth thread defined in the fourth side face and configured to receive the second threaded rod to be cut. Crests and troughs of the fourth thread may be aligned with troughs and crests of the thread of the second threaded rod when the second die engages the second threaded rod. The second threaded rod, the third arcuate recess and the fourth arcuate recess each may have a diameter less than a diameter of the first threaded rod, the first arcuate recess, and the second arcuate recess. The third thread may have a third trough starting point in a plane of the third front face and the fourth thread may have a fourth trough starting point in a plane of the second front face. The third and fourth trough starting points may be located such that the third and fourth threads form a continuous helical path when the first and second dies are closed around the second threaded rod. The third trough starting point may located at a third acute angle in a clockwise direction relative to a third radius that extends inward from the third side face and bisects the third recess. The fourth starting point may be located at a fourth acute angle in a counter-clockwise direction relative to a fourth radius that extends outward from the fourth side face and bisects the fourth recess.

In another aspect, a set of dies is configured to be coupled to a machine for cutting threaded rods A first die has a first body with a first front face, a first rear face, a first side face extending between the first front face and the first rear face, and a first threaded arcuate recess with a first thread defined in the first side face and configured to receive a portion of a first threaded rod to be cut. A second die has a second body with a second front face, a second side face extending between the second front face and the second rear face, and a second threaded arcuate recess with a second thread defined in the second side face and configured to receive a portion of the first threaded rod to be cut. The first and second threads are configured to form a discontinuous helical path when the first and second dies are closed around the first threaded rod.

Implementations of this aspect may include one or more of the following features. The second thread may bias the second die toward the first die when cutting the first threaded rod. The first thread may have a first starting point in a plane of the first front face and the second thread has a second starting point in a plane of the second front face. The first and second starting points may be located such that the first and second threads form the discontinuous helical path when the first and second dies are closed around the first threaded rod. The first thread may have a first trough starting point in a plane of the first front face and the second thread may have a second trough starting point in a plane of the second front face. The first and second trough starting points may be located so that the first die is interchangeable with the second die. The first angle and the second angle may each approximately 50° to approximately 60°. The first die may be configured to be stationary while cutting a threaded rod, and the second die is configured to be moveable while cutting a threaded rod.

The first die may include a third side face extending between the first front face and the first rear face, and a third threaded arcuate recess with a third thread defined in the third side face and configured to receive a second threaded rod to be cut. The second die may include a fourth side face extending between the second front face and the second rear face, and a fourth threaded arcuate recess with a fourth thread defined in the fourth side face and configured to receive the second threaded rod to be cut. The third thread may have a third starting point at the first front face and the fourth thread may have a fourth starting point at the second front face. The third and fourth starting points may be located such that the third and fourth threads form a continuous helical path when the first and second dies are closed around the second threaded rod. Crests and troughs of the third thread may be aligned with troughs and crests of a thread of the second threaded rod when the first die engages the second threaded rod. Crests and troughs of the fourth thread may be aligned with troughs and crests of the thread of the second threaded rod when the second die engages the second threaded rod. The second threaded rod, the third arcuate recess and the fourth arcuate recess each may have a diameter less than a diameter of the first threaded rod, the first arcuate recess, and the second arcuate recess.

Advantages may include one or more of the following. The dies can be reversibly attachable to the threaded rod cutting machine as either a moveable die or a stationary die so that there is no need to manufacture or sell two different dies for the threaded cutting machine, and no need for a user to differentiate between the two dies. A single die can be used to cut more than one size of threaded rod. The dies may only be installed on the threaded rod cutting machine in the correct, and not the reverse, orientation. These and other advantages and features will be apparent from the description, the drawings, and the claims.

BRIEF DESCRIPTION OF THE DRAWINGS

FIGS. 12A-12D are perspective views illustrating rotation of the die of FIG. 8 between a stationary die position and a moveable die position.

FIG. 14A is a perspective view of the die of FIG. 8 showing start points for the thread in one of its arcuate recesses.

FIG. 14B is a side view of the die of FIG. 14A.

FIG. 14C is a top view of the die of FIG. 14A.

DETAILED DESCRIPTION

Figure 1:
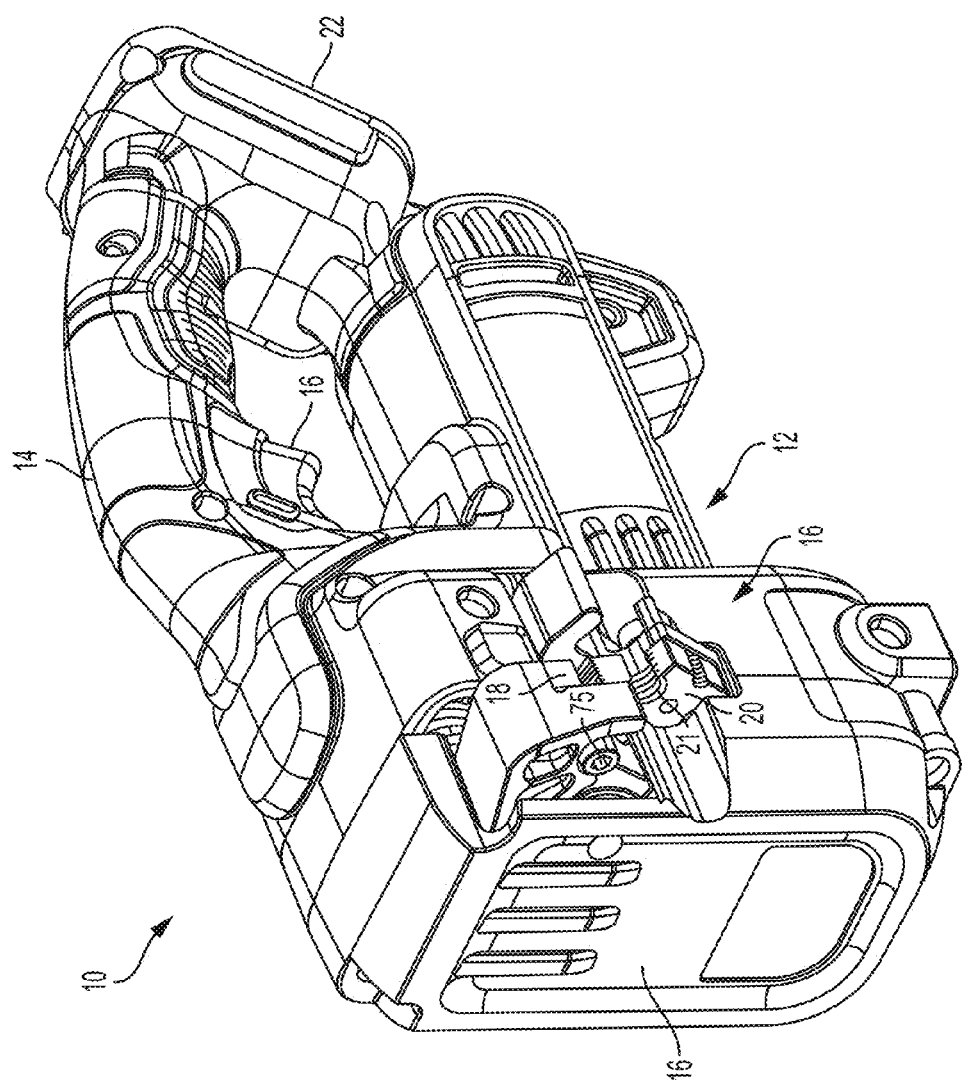
FIG. 1 is perspective view of a threaded rod cutting machine.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Figure 2:
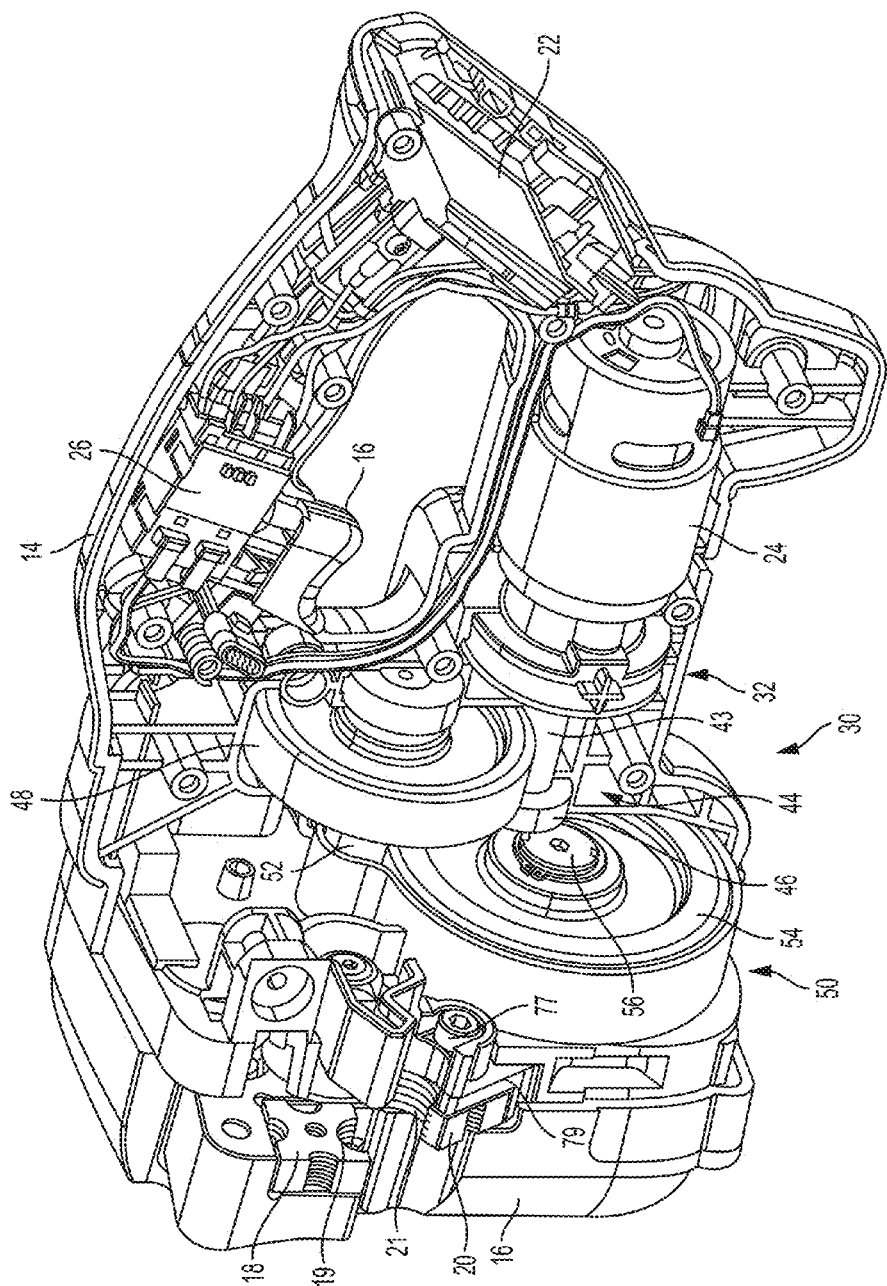
FIG. 2 is a perspective view of the threaded rod cutting machine of FIG. 1 with a portion of the housing removed.

Referring to FIGS. 1 and 2, a threaded rod cutting machine 10 comprises a housing 12 with a handle 14, a trigger 16 coupled to the handle 12, and a front cover 16. The housing 12 contains a motor 24 and a speed reduction transmission 30. The cover 16 contains a cam driving mechanism 60 that is coupled to the transmission 30 (as shown and described in more detail below). Exposed from the housing 12 is a pair of cutting dies 18, 20 that are coupled to the cam driving mechanism 60. The cutting die 20 is fixed in position relative to the housing 12, while the cutting die 18 is moveable relative to the housing 12. The dies 18, 20 each include at least one concave recess 19, 21, which are configured to receive a threaded rod 120 between the dies 18, 20. Actuation of the trigger 14 causes the motor 24, transmission 30, and cam driving mechanism 60 to cause the moveable die 18 to move toward and past the fixed due 20 to cut the threaded rod 120 by a shearing action.

The motor 24 (which may be any type of motor such as an AC motor, a DC motor, a universal motor, a brushless motor, an air motor, or a combustion motor) is configured to be coupled to a power source (not shown). In the disclosed embodiment, the housing 12 includes a receptacle 22 configured to receive a removable and rechargeable battery. However, it should be understood that the machine could additionally or alternatively be coupled to another source of electrical or non-electrical power (e.g., a built in battery, a non-rechargeable battery, an AC power source, a source of compressed air, a fuel cell, etc.). The motor 24 is electrically connected to the electrical power source by a switch 26, which is actuated by the trigger 16 to control power delivery from the power source to the motor 24. The switch 26 may provide for constant or variable speed operation of the motor 24.

Figure 3:
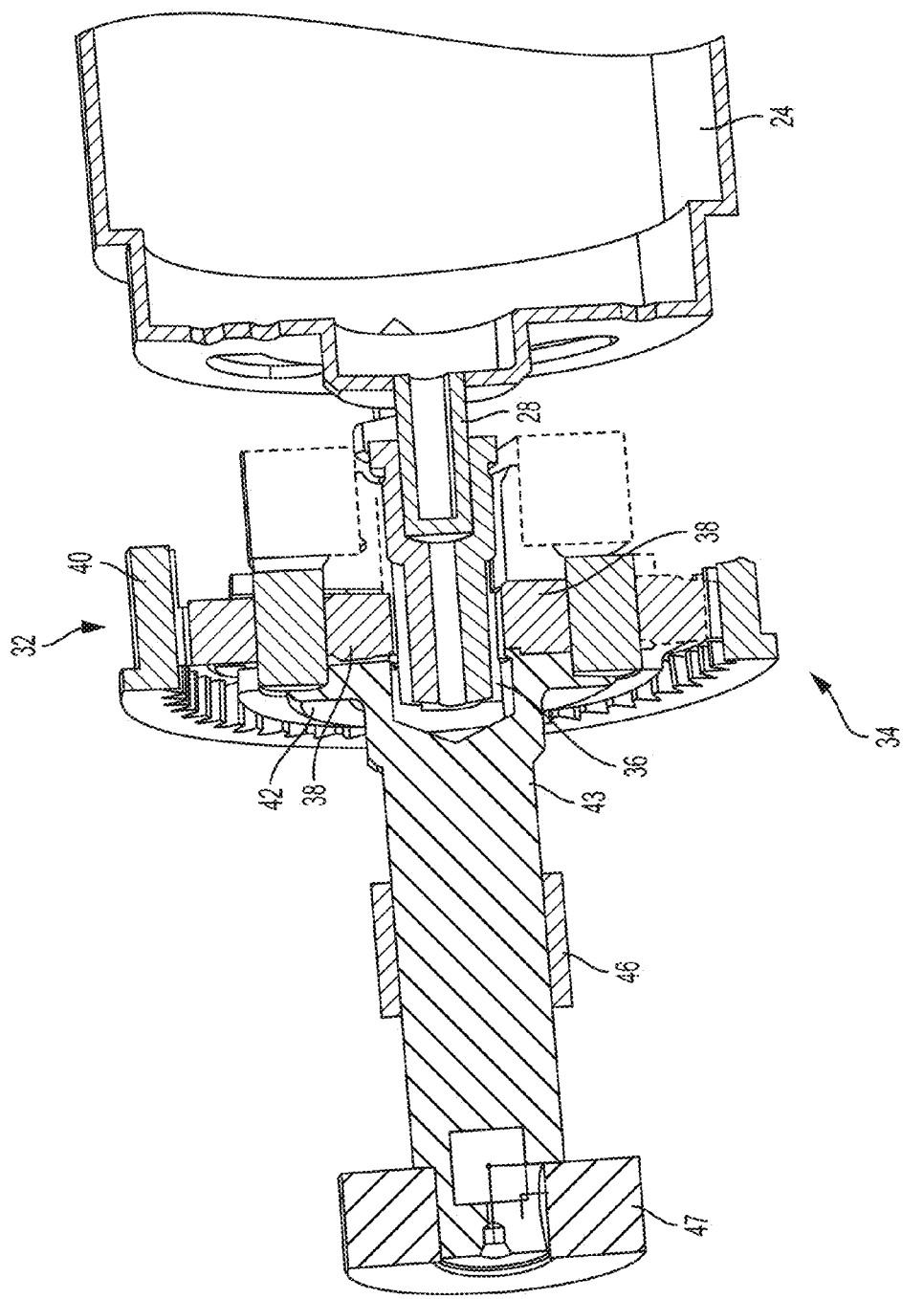
FIG. 3 is cross-sectional view of a portion of a transmission of the threaded rod cutting machine of FIG. 1.

Referring also to FIG. 3 the motor 24 includes a rotatable output shaft 28, which is drivingly coupled to the speed reduction transmission 30. The transmission 30 has three stages that greatly reduce the speed and increase the torque from the output of the motor 24. The first stage 32 comprises a planetary gear set 34 having an input sun gear 36 fixed to the motor output shaft 28, a plurality of planet gears 38 that mesh with and orbit the sun gear, a stationary ring gear 40 that surrounds and meshes with the planet gears 38, and an output carrier 42 to which the planet gears 38 are pinned. The output carrier is fixed to an intermediate shaft 43. Rotation of the motor output shaft 28 and sun gear 36 at a first speed causes the planet gears 38 to orbit the sun gear 36, which in turn causes output rotation of the planet carrier 42 and the intermediate shaft 43 at a second speed, which is slower than the first speed of the sun gear 36.

The second stage 44 includes a second stage pinion gear 46 that is non-rotationally fixed to the intermediate shaft 43 so that it is driven at the same second rotational speed as the first stage output carrier 42. The intermediate shaft 46 is supported at one end by a bearing 47. The second stage pinion gear 46 drivingly meshes with a much larger second stage spur gear 48, with the pinion gear 46 and spur gear 48 having parallel axes. Rotation of the second stage pinion gear 46 at the second speed drives the second stage spur gear 48 to rotate at a third speed, which is slower than the second speed of the second stage pinion gear 46.

The third stage 50 includes a third stage pinion gear 52 non-rotationally fixed to the second stage spur gear 48 so that it is driven at the same third rotational speed as the second stage spur gear 48. The third stage pinion gear 52 drivingly meshes with a much larger third stage spur gear 54, with the pinion gear 52 and spur gear 54 having parallel axes. Rotation of the third stage pinion gear 52 at the third speed drives the third stage spur gear 54 at a fourth speed, which is slower than the third speed of the third stage pinion gear 42.

Figure 4:
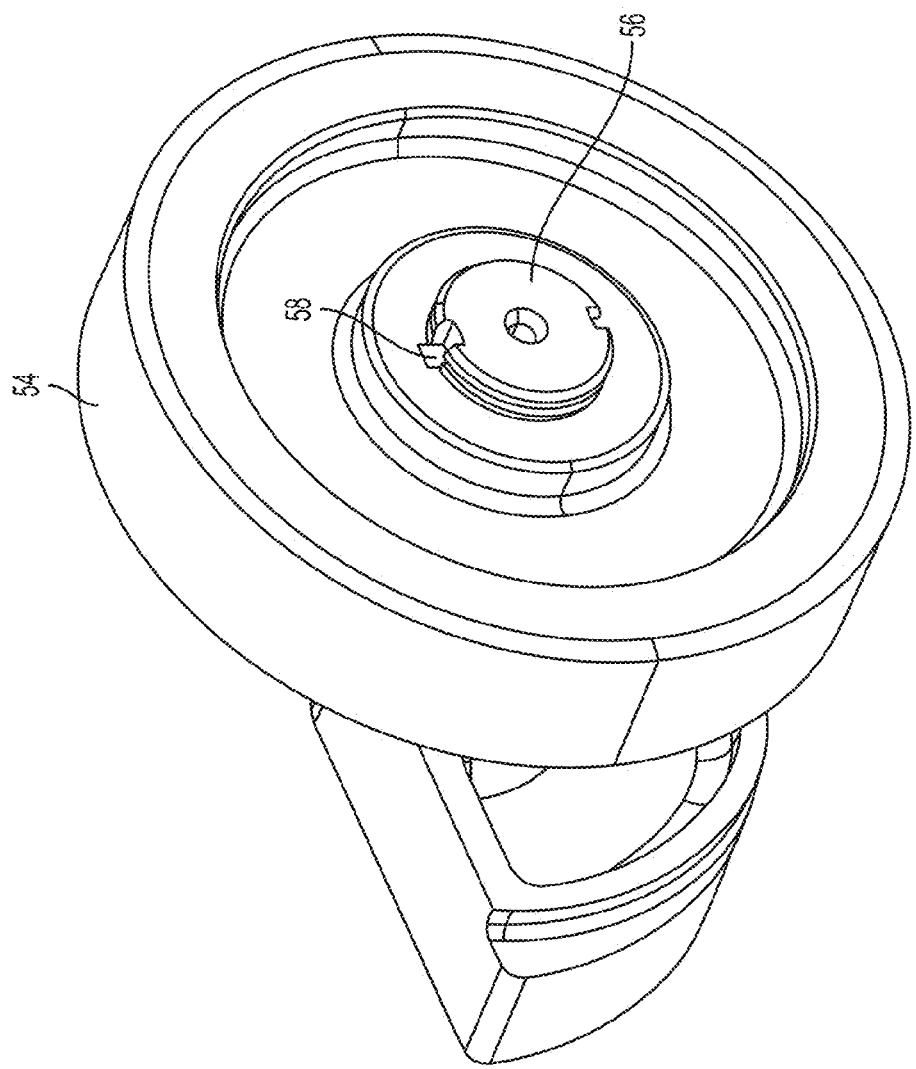
FIG. 4 is a perspective view of a portion of a cam driving mechanism of the threaded rod cutting machine of FIG. 1.

Referring also to FIG. 4, the third stage spur gear 54 is non-rotationally coupled to a transmission output shaft 56. The output shaft 56 is transmits rotational power from the transmission 30 to the cam driving mechanism 60 at the fourth rotational speed. The third stage spur gear 54 is coupled to the transmission output shaft 56 by a key 58. The key 58 is configured to shear and interrupt power transmission to the output shaft 56 if the torque encountered by the output shaft 56 exceeds a predetermined threshold value. In other embodiments, the output shaft 56 may be coupled to the third stage spur gear 54 by other mechanisms, such as a plurality of keys that shear at high torque, by a plurality of splines, or by a press-fit.

Figure 5:
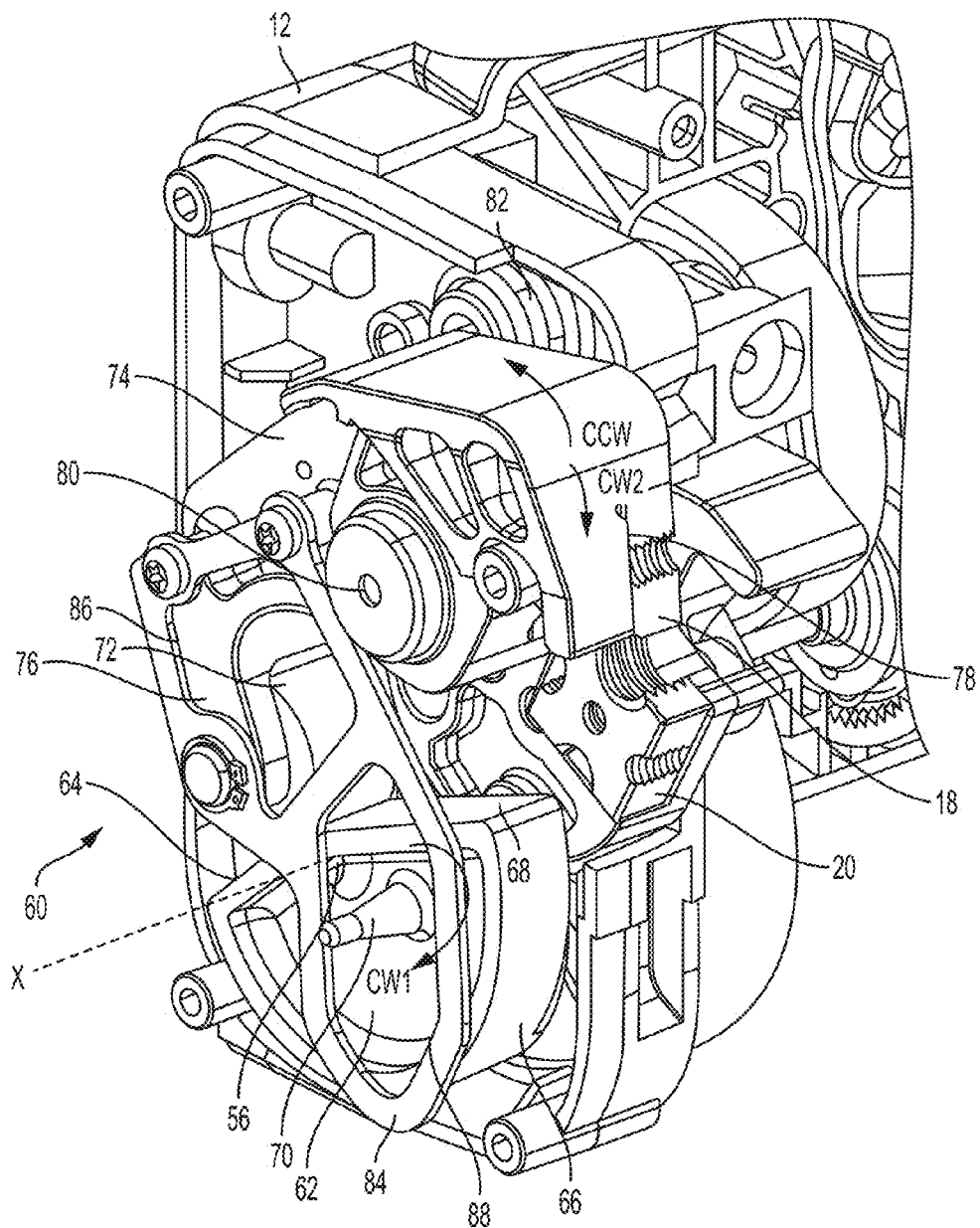
FIG. 5 is a perspective view of a portion of the threaded rod cutting machine of FIG. 1 with the cover removed.

Referring to FIG. 5, the cam driving mechanism 60 converts rotational motion of the transmission output shaft 56 to the shearing motion of the movable die 18. The cam driving mechanism 60 comprises an input cam wheel 62 that is non-rotationally fixed to the transmission output shaft 56 and that rotates about an input axis X in a first clockwise direction CW1. The input cam 62 includes a driving flat surface 64, a driving arc surface 66, and a return flat surface 68. Also coupled to the input cam is an eccentric pin 70 that is mounted eccentrically relative to the input axis X. The input cam 62 abuts against an output cam follower 72. The output cam roller 72 is configured to roll along the surfaces 64, 66, 68 of the input cam 62 as the input cam 62 rotates about the input axis X.

The output cam roller 72 is mounted to a first end 76 of a lever arm 74. The moveable die 18 is mounted to a second end 78 of the lever arm 74 by a threaded bolt 75, which is inserted through a threaded bore in a rear face of the die 18 (FIG. 1). The stationary die 20 is mounted to a stationary arm 79 on the housing 12 by a threaded bolt 77, which is inserted through a rear face of the die 20 (FIG. 2). The lever arm 74 is mounted to the housing 12 to pivot about a fulcrum 80. When the lever arm 74 pivots in a second clockwise direction CW2 about the fulcrum 80, the moveable die 18 approaches and moves past the stationary die 20 in a shearing motion to cut the threaded rod 120. The lever arm 74 is coupled to the tool housing 12 by a torsional return spring 82 that biases the second end 78 of the lever arm 74 and the moveable die 18 away from the stationary die 20 in a counterclockwise direction CCW about the fulcrum 80. A return plate 84 is fixedly mounted to the first end 76 of the lever arm 74. The return plate 84 includes a first opening 86 and a second opening 88. The second opening 88 is sized and configured so that the eccentric pin 70 follows an interior edge of the second opening 88 as the input cam 62 rotates about the axis X.

Figure 6A:
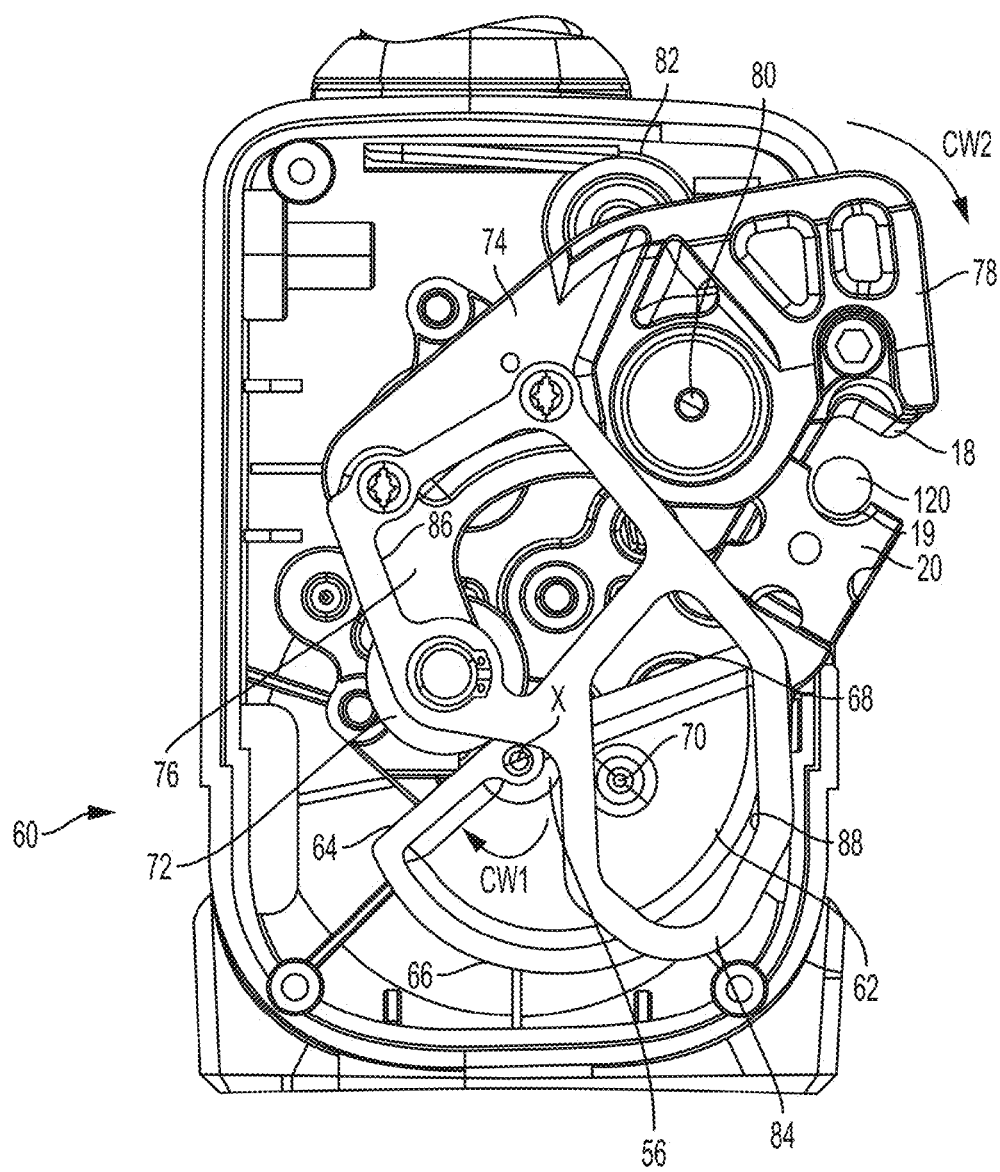
FIGS. 6A-6D are side views of the cam driving mechanism of the threaded rod cutting machine of FIG. 1 with the dies in different operational positions.
Figure 6B:
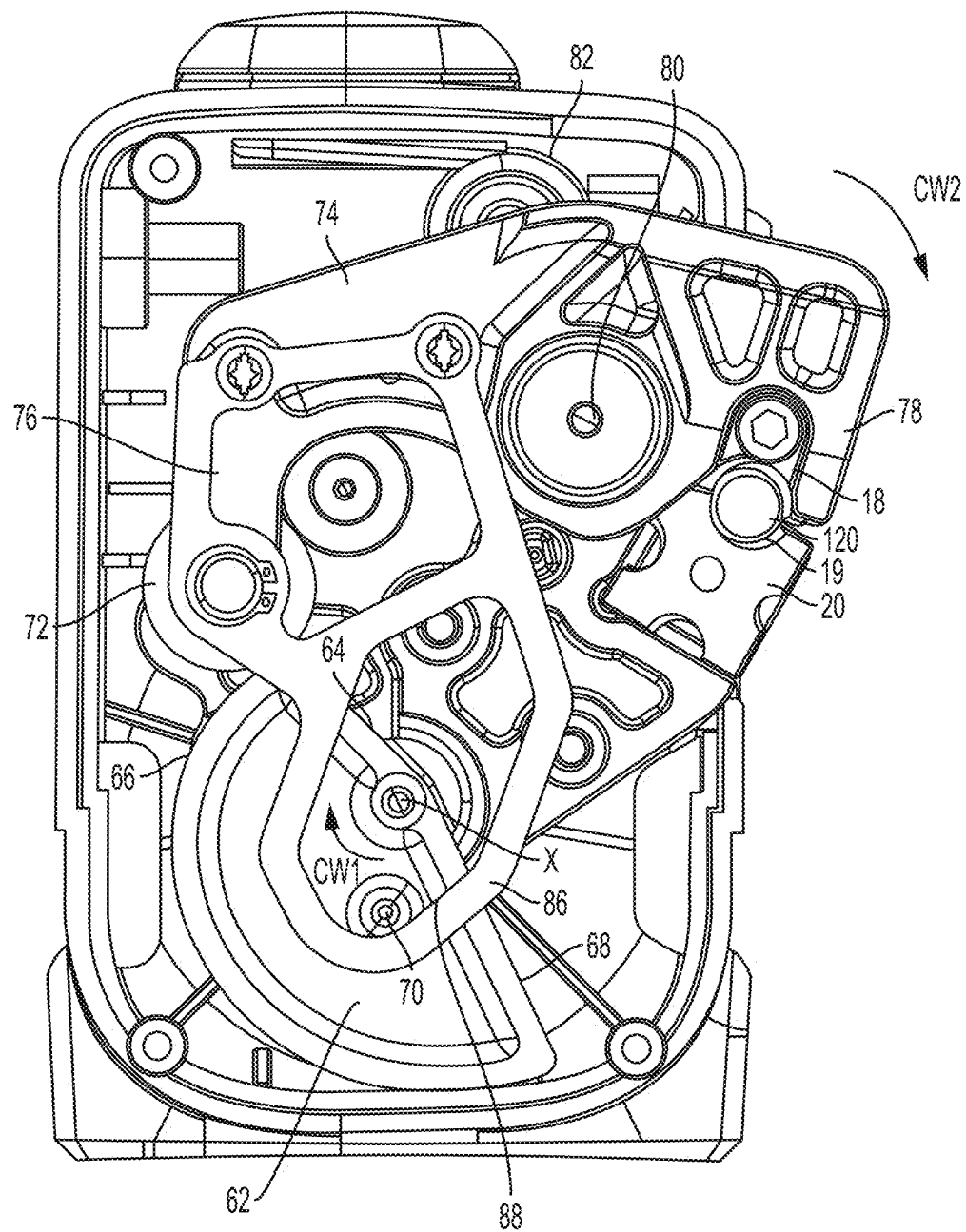
Figure 6C:
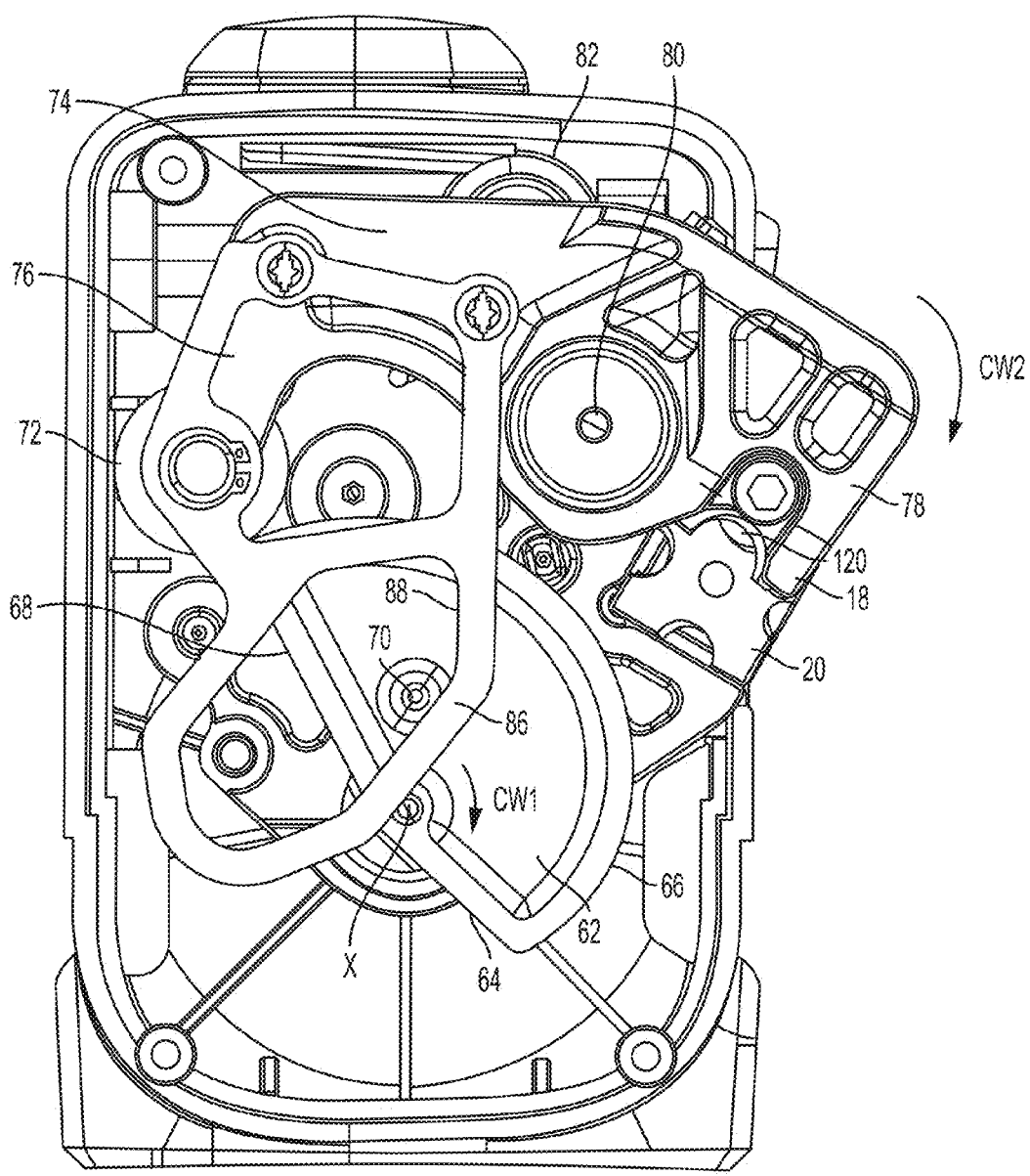

FIGS. 6A-6D illustrate the operation of the cam driving mechanism 60. Referring to FIG. 6A, at an initial open position, the moveable die 18 is fully open relative to the stationary die 20. A threaded rod 120 to be cut is placed in a recess 21 of the stationary die 20. Referring to FIG. 6B, during a driving stroke, rotation of the motor 24 is transmitted to the input cam 62 through the transmission 30. This causes the input cam 62 to rotate in the first clockwise direction CW1 about the axis X. The output cam roller 72 rolls along the driving flat 64 of the input cam wheel 62, which in turn causes the lever arm 74 to pivot in the second clockwise direction CW2 about the fulcrum 80, bringing the moveable die 20 closer to the stationary die 18. Referring to FIG. 6C, during a power stoke, the motor 24, through the transmission 30, causes the input cam 62 to continue to rotate in the clockwise direction CW1 about the axis X. The cam roller 72 rolls along the driving arc surface 66 of the input cam 62. This causes the lever arm to pivot further in the second clockwise direction CW2 about the fulcrum 80, causing the moveable die 18 to close around the threaded rod 120 and move past the stationary die 20, shearing the threaded rod 120.

Figure 6D:
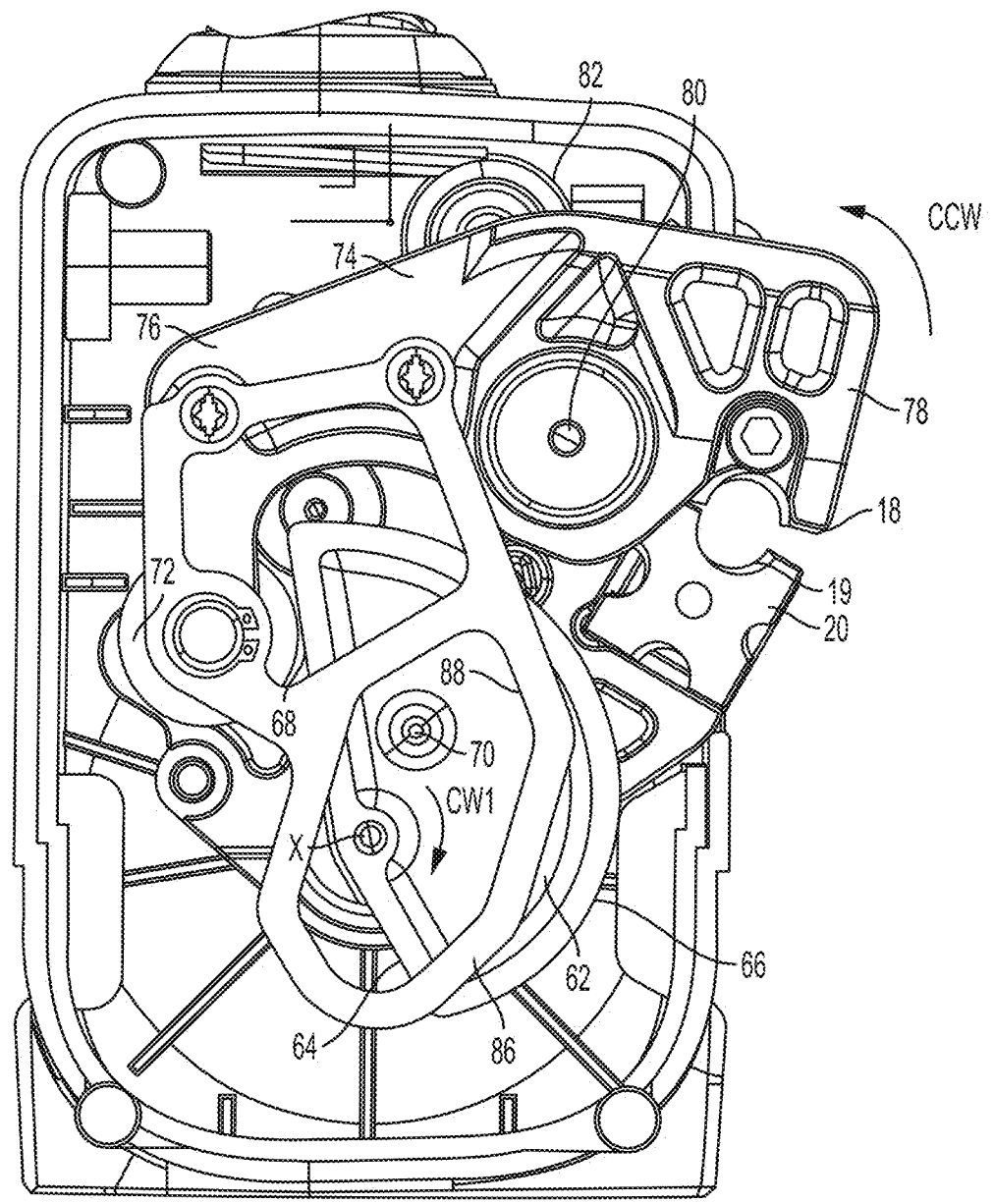

Referring to FIG. 6D, during a return stroke, the input cam 62 continues to rotate in the first clockwise direction CW1 about the axis X, which causes the cam roller 72 to roll along the return flat surface 68 of the input cam wheel 62. Under the urging of the torsional spring 82, this causes the lever arm 74 to pivot in the counterclockwise direction CCW about the fulcrum 80. This moves the moveable die 18 away from the stationary die 20 back toward the fully open position shown in FIG. 6A. If the moveable die 18 gets stuck in the closed position shown in FIG. 6C, the eccentric pin 70 also pushes against the interior edge of the second opening 88 in the plate 84, which assists the lever arm 74 to pivot in the counterclockwise direction CCW about the fulcrum 80.

Referring to FIGS. 7-11, in an embodiment, the dies 18 and 20 are identical and reversible so that the moveable die 18 can be installed as the stationary die 20 and vice versa. For convenience, only one such die 100 will be described in detail. Each die 100 has a body 101 with a generally polyhedral shape, e.g., a square or rectangular prismatic shape. Each die 100 has a front cutting face 102 and a rear face 104 that are generally parallel to each other. A plurality of side faces 106a-106d (e.g., four side faces) extend between the front face 102 and the rear face 104, substantially perpendicular to the front face 102 and to the rear face 104. Each die 100 has cutting edges 112a-112d at the edges defined by the junctions between the side faces 106a-106d and the front cutting face 102.

Each of the side faces 106a-106d defines an arcuate recess 114a-114d for receiving the threaded rod 120. Each arcuate recess 114a-114d has a partially cylindrical shape (e.g., half of a cylinder) that extends from the cutting face 102 to the rear face 140, and is threaded along its length by a thread 116a-116d. The radius of each recess 114a-114d is sized to receive a threaded rod of a corresponding diameter, while the pitch and size of the thread 116a-116d is configured to correspond to a thread pitch and size on the threaded rod 120. In an embodiment, one or more of the recesses 114a-114d may have different sizes and/or thread pitches to accommodate different sized or configured threaded rods. Thus, the dies 100 can be rotated and mounted at different angular positions on the lever arm 74 and stationary arm 79 (as described above) in order to cut a plurality of different sized threaded rods. In this manner, the dies 100 function to cut a variety of sizes of threaded rods.

Figure 11:
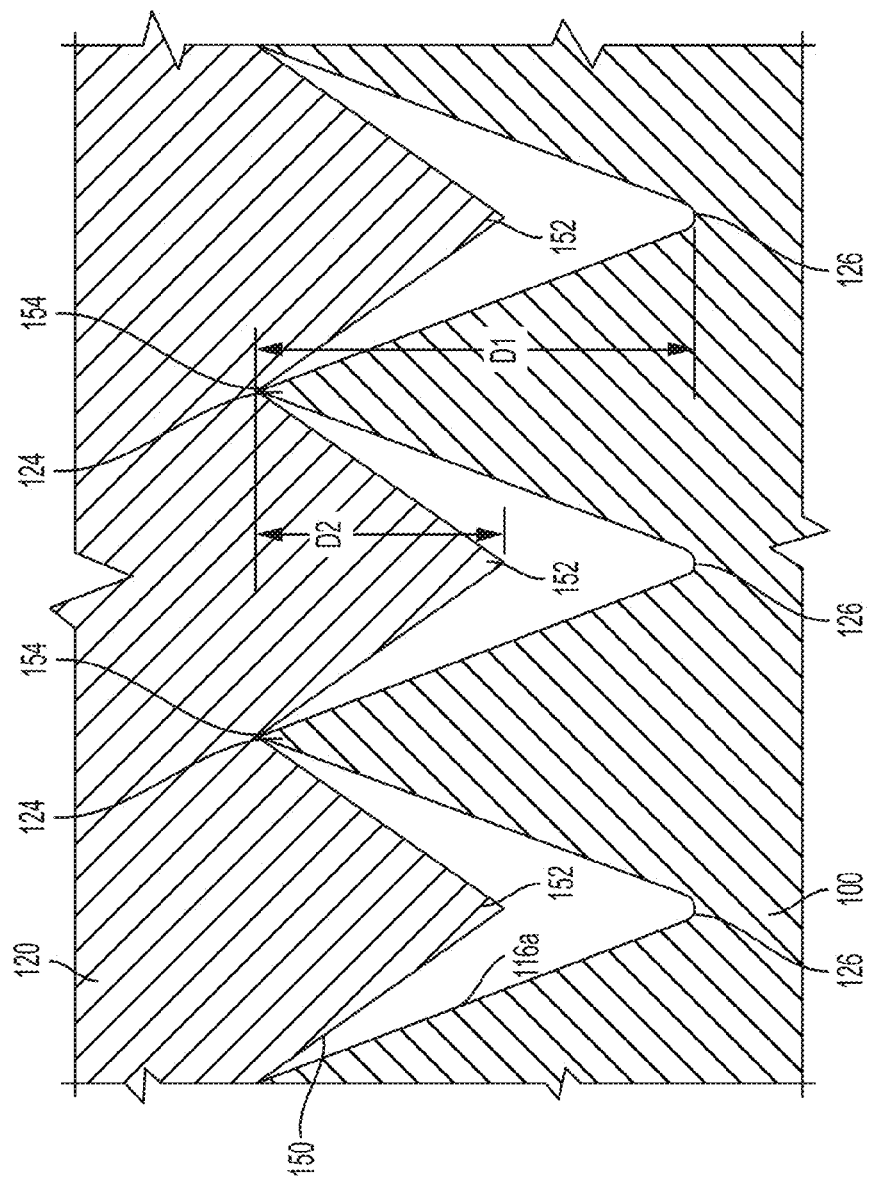
FIG. 11 is a close-up cross-sectional view of a thread of one of the threaded recesses of the die of FIG. 8 engaging a thread of a threaded rod.

Referring to FIG. 11, a thread 116a on the die 100 has a thread crest 124 and a thread trough 126 configured differently than a thread crest 152 and thread tough 154 of the threaded rod 120, in order to make a cleaner cut in the threaded rod. For example, as shown schematically in FIG. 11, the thread trough 126 of the thread 116a on the die 100 may have a depth D1 (as measured from the thread crest 124) that is greater than a depth D2 of the thread trough 154 of the thread 150 of the threaded rod (as measured from the thread crest 152). The allows the thread crest 124 of the die 100 to engage the thread trough 154 of the threaded rod while preventing the thread trough 126 of the die 100 from engaging the thread crest 152 of the threaded rod. It is believed that this results in a cleaner cut to the threaded rod because the thread crests 124 of the cutting dies 100 concentrate the cutting forces at the thread roots 154 of the threaded rod 120, leaving the thread crests 152 of the threaded rod 120 less disturbed.

Figure 10:
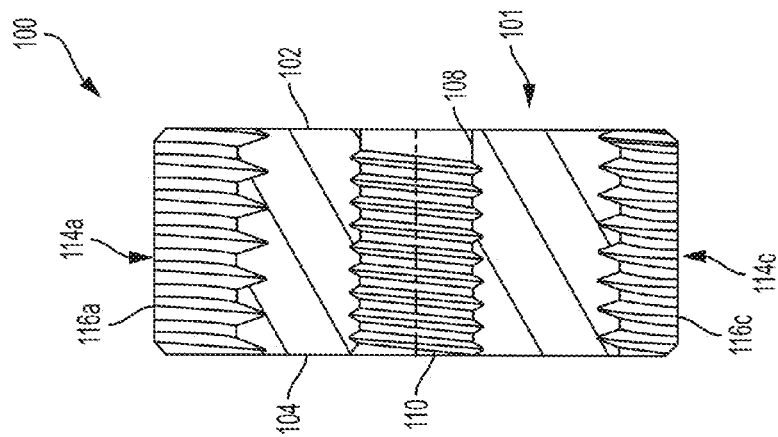
FIG. 10 is a cross-sectional view of the die of FIG. 9 taken along line 10-10.
Figure 9:
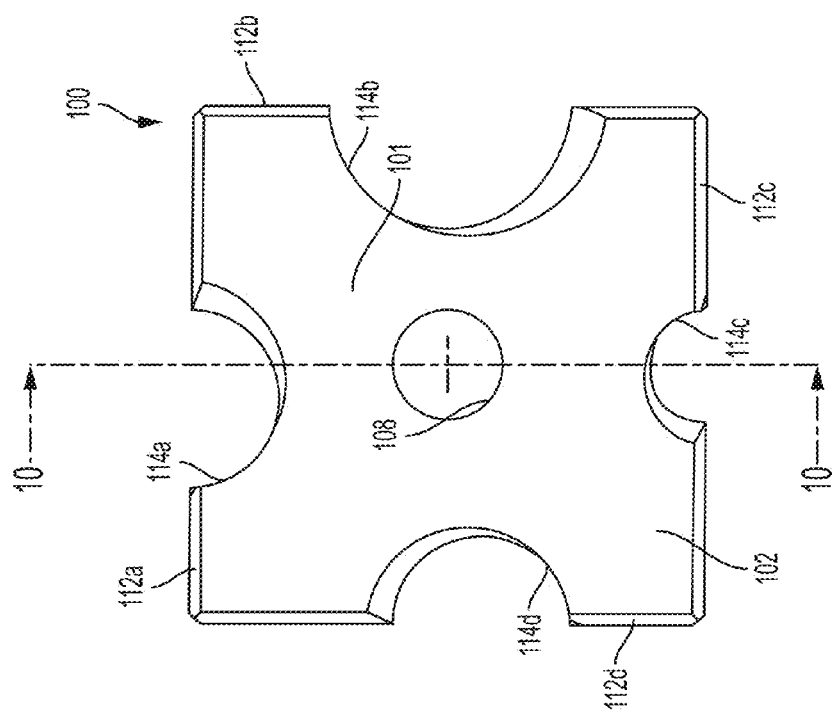
FIG. 9 is a front view of one of the dies of FIG. 8.

Referring to FIG. 10, each die 100 has a fastener receiver (e.g., a through bore 108) that is configured to be coupled to a fastener (e.g., mounting bolts 75, 77) on the threaded rod cutting machine. The bore 108 extends through a center of the body 101 from the front face 102 to the rear face 104 along a center axis A that is substantially perpendicular to the front face 102 and to the rear face 104. The bore 108 is partially threaded by a thread 110 that starts at the rear face 104 but that terminates before reaching the front face 102. Because of this partial thread, the threaded mounting bolts 75, 77 on the arms 72, 79 can only be inserted in one direction through the die 100, starting at the rear face 104 of the die 100. Thus, the dies 18, 20 can only be installed in the threaded cutting tool with their rear faces 104 facing their respective arms 74, 79. This prevents the dies 100 from inadvertently being installed backwards on the arms 74, 79.

Referring to FIG. 7 and FIGS. 12A-12D, as discussed above, each of a pair of identical dies 100 may be installed in the position of the stationary die 20 and/or in the position of the moveable die 18. The side faces, cutting edges, and arcuate recesses that face each other are said to be the active side faces, cutting edges, and arcuate recesses. The dies 100 can be installed on the arms 72, 79 at different angular positions so that each of the cutting edges, side faces and recesses can be active. As illustrated in FIGS. 7 and 12A-12D, the side face 106a, the cutting edge 112a and the annular recesses 114a of the die 100 are active. However, it should be understood that any of the side faces, cutting edges and annular recesses of the cutting die 100 may be made active by rotating the die 100 about the threaded bore 108. To move the die 100 between the stationary die position 20 and the moveable die position 18, the die 100 can be rotated about a rotation axis B that is located along or parallel to the active cutting edge of the die 100. In this example, the die 100 can be rotated by an angle θ of approximately 180 degrees about the axis B between the position of the stationary die 20 and the position of the moveable die 18.

Figure 7:
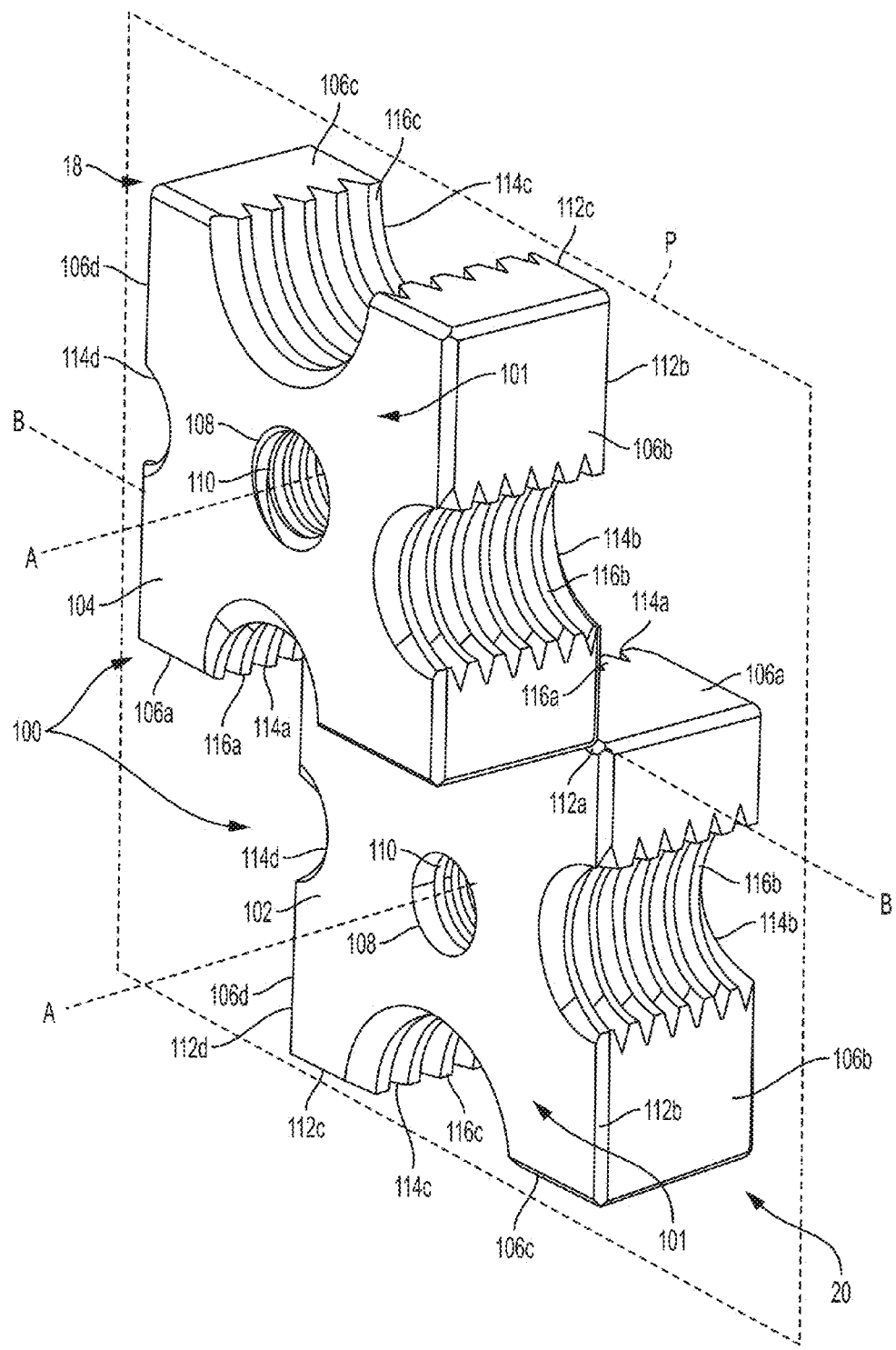
FIG. 7 is a perspective view of a first embodiment of a pair of dies for use with the threaded rod cutting machine of FIG. 1.
Figure 8:
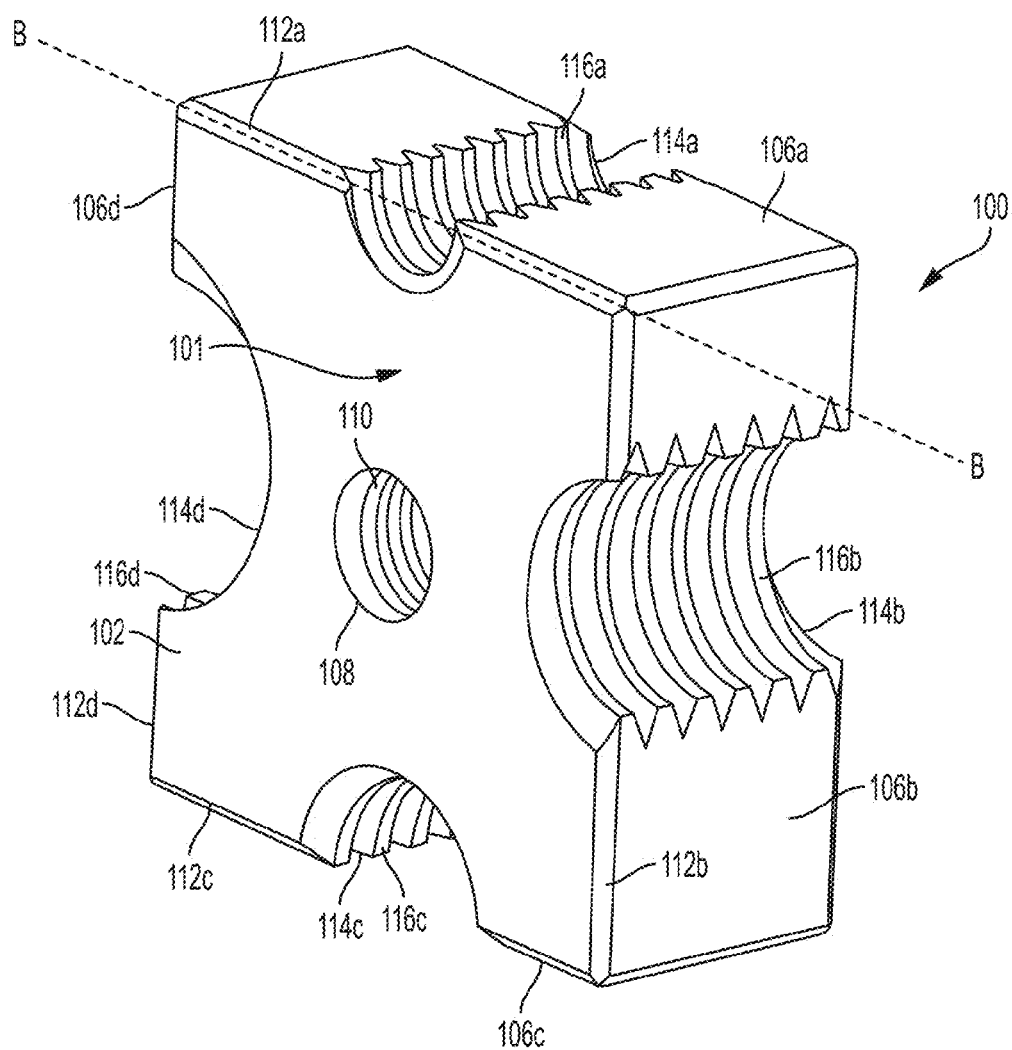
FIG. 8 is a perspective view of one of the dies of FIG. 7.
Figure 13A:
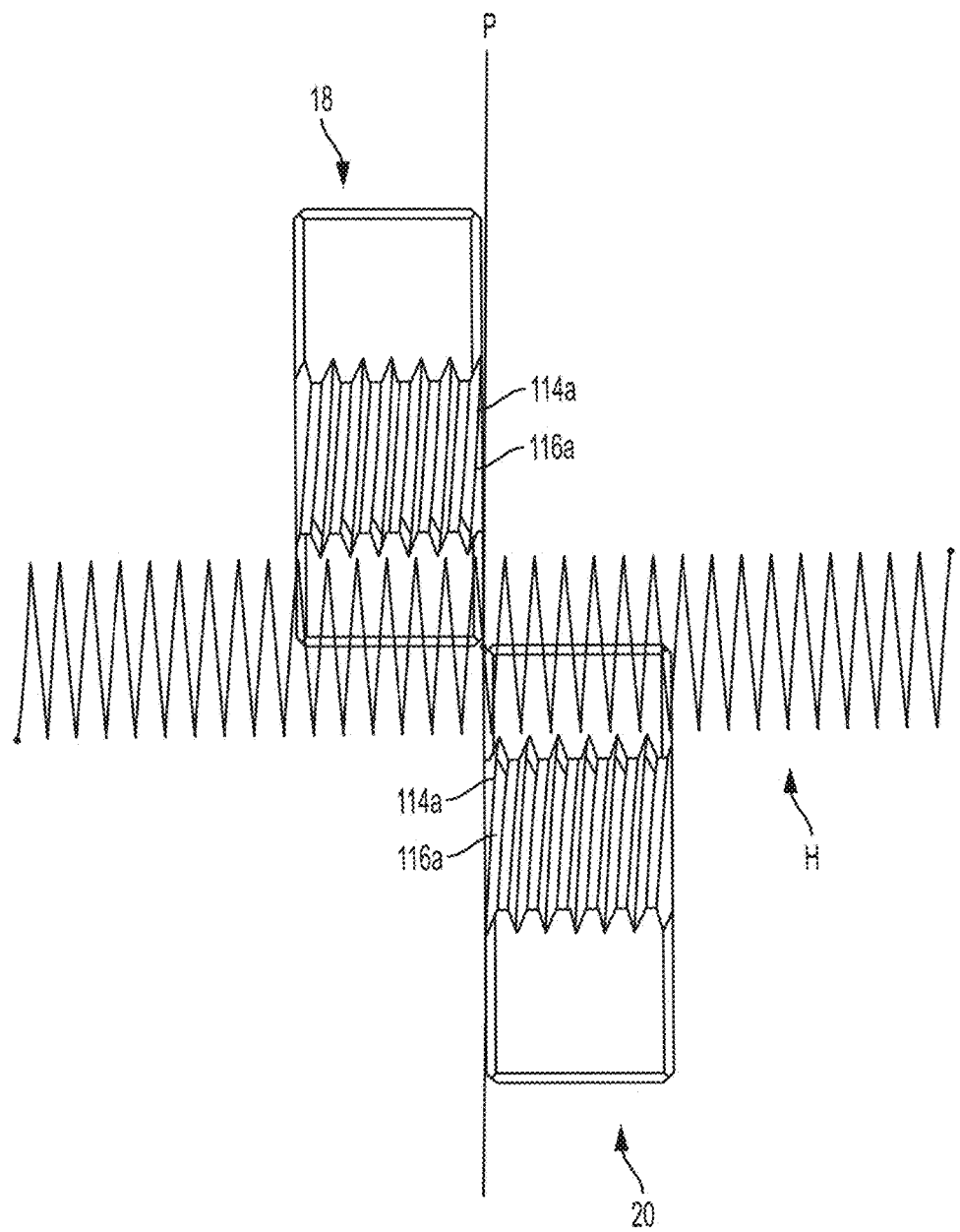
FIG. 13A is a schematic side view of the dies of FIG. 7 with the helical thread paths of their arcuate recesses aligned.

Referring to FIGS. 7 and 13A, to obtain a clean cut of a threaded rod, the front cutting faces 102 of the dies 18, 20 should substantially lie in a common cutting plane P so that the front cutting faces 102 do not overlap and are not substantially spaced apart. Referring also to FIGS. 14A-14C, in order to achieve this optimal positioning of the dies 18. 20 with their front cutting faces 102 substantially in a common plane P, the helical paths H traced by the threads 116a of the active recess 114a should be as close as possible to continuous as possible when the dies are closed about the threaded rod 120. In order to trace such a continuous helical path H, the starting points of the threads 116a of the active recesses 114a on the stationary die and the moveable die should substantially coincide or touch each other when the dies are closed around a threaded rod to be cut so that the path of the thread is continuous around the threaded rod. In particular, the threads 116a of the active recesses 114a on each of the dies each should have an actual or theoretical starting point that substantially coincides with a line L that bisects the threaded rod 120 when the dies are closed about the threaded rod 120. In this embodiment, the line L happens to coincide with the rotation axis B about which the die 100 is rotated between the position of the stationary die 20 and the position of the moveable die 18. In addition, because the active recess 114a is a half-cylinder, the line L also coincides with the active cutting edge 112a of the die 100.

In this example, the thread crest 124 or the thread trough 126 of the die 100 has an actual starting point that lies in the plane of the front cutting face 102 along a circumference C of the recess 116a that intersects the line L. It should be noted that this means that there are two possible starting points 122A, 122B for the thread crest 126 or threaded trough 126. In this embodiment, because the arcuate recess 112a is a half-cylinder, the actual starting points 122A, 122B are positioned along the cutting edge 112a and in the plane of the active side face 104a. In this embodiment, the thread crest 124 begins at starting point 122A and the thread trough 126 begins at starting point 122B. In alternative embodiments, only the thread trough 126 may begin at starting point 122A or starting point 122B, only the thread crest 124 may begin at starting point 122A or starting point 122B, or the thread crest 124 may begin at starting point 122B and the thread trough 126 may begin at starting point 122A. This also enables the die 100 to be reversibly attachable as either the moveable die 18 or the stationary die 20 because the starting points on the two dies will always substantially coincide.

Figure 13B:
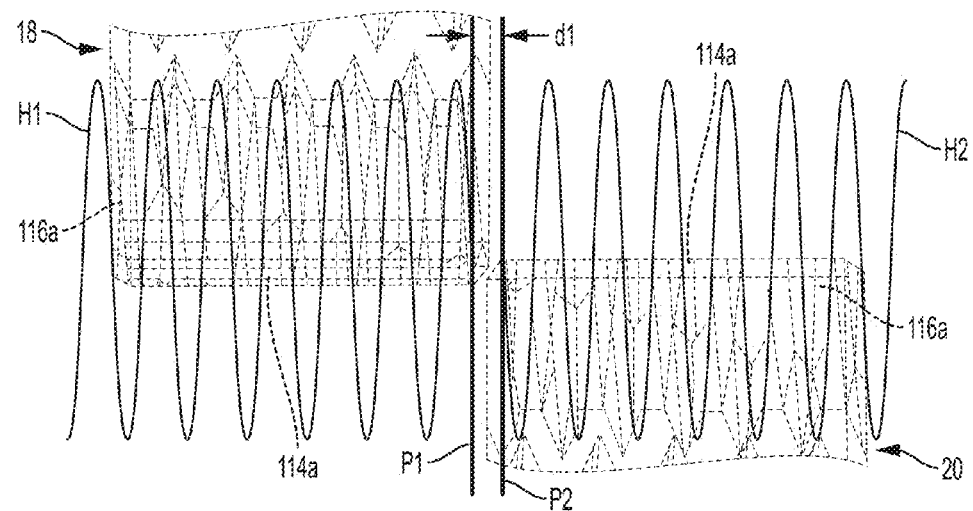
FIGS. 13B and 13C is a schematic side view of alternative pairs of dies with the helical thread paths of their arcuate recesses misaligned.
Figure 13C:
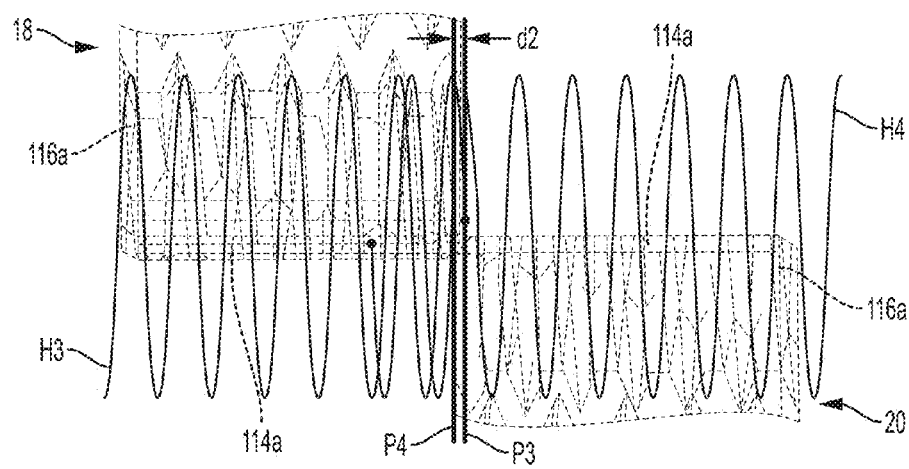

Referring also to FIGS. 13B and 13C, if the starting points of the thread crest 124 or the thread trough 126 are not positioned at the optimal starting points 122A or 122B, the threads 116a of the active recesses 114a will not follow the desired continuous helical path H. For example, if the thread crest 124 has a starting point at 122C that is offset from the optimal starting point 122A by approximately 45 degrees (as shown in FIG. 14B), then, as shown in FIG. 13B, the helical paths H1 and H2 traced the threads 116a of dies 18, 20 will be spaced apart by a distance d1. This will result in the cutting faces 102 of the dies 18, 20 being in planes P1 and P2 that are spaced apart by the distance d1, resulting in a poor cut to the threaded rod. In another example, if the thread crest 124 has a starting point at 122D that is offset from the optimal starting point 122A by approximately 135 degrees (as shown in FIG. 14B), then, as shown in FIG. 13C, the helical paths H3 and H4 traced the threads 116a of dies 18, 20 will overlap by a distance d2. This will result in the cutting faces 102 of the dies 18, 20 being in planes P3 and P4 that overlap by the distance d2, resulting in the dies hitting each other upon cutting and resulting in a poor cut to the threaded rod. Thus, if the threads 116a do not start at the optimal starting points, the die 100 will not be reversibly attachable as either the moveable die 18 or stationary die 20 without adversely affecting the quality of the cut to the threaded rod.

Figure 15:
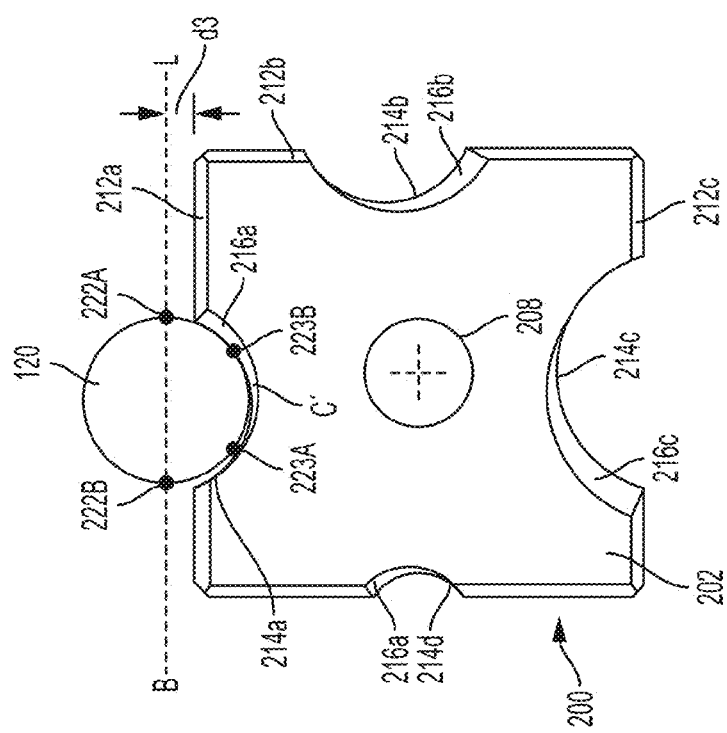
FIG. 15 is a side view of second embodiment of a die for use with a threaded rod cutting machine.

Referring to FIG. 15, in another embodiment, a die 200 has a generally polyhedral body 201, a front cutting face 202, a rear face (not shown), and a plurality of side faces (not shown) extending between the front face 202 and the rear face. The die 200 has cutting edges 212a-212d at the edges defined by the junctions between the side faces and the front cutting face 202. Each of the side faces defines an arcuate recess 214a-214d with a thread 216a-216d for receiving the threaded rod 120. Unlike the die 100, in the die 200, the arcuate recesses 214a-214d each have a partially cylindrical shape that is less than half of a cylinder. Thus, the line L that bisects the threaded rod 120 (and the rotation axis B' about which the die 200 is rotatable between the stationary die position and the moveable die position) are disposed a distance d3 away from the active cutting edge 212a.

In order to achieve optimal positioning of the dies 200 with their front cutting faces 202 in substantially in a common plane, the thread crest or thread trough of the thread 216a will have a theoretical starting point 222A or 222B along a circumference C' of the arcuate recess 214a that intersects the bisecting line L'. In the illustrated embodiment, the thread crest has a theoretical starting point 222A and the thread trough has a theoretical starting point 224B. It should be noted that an actual starting point 223A for the thread crest will be at a point where the adjacent thread crest intersects the front cutting face 202, and an actual starting point 223B for the thread through will be at a point where the adjacent thread trough intersects the front cutting face 202. In alternative embodiments, only the thread trough may begin at the theoretical starting point 222A or the theoretical starting point 222B, only the thread crest may begin at the theoretical starting point 222A or the theoretical starting point 222B, or the thread crest may begin at the theoretical starting point 222B and the thread trough may begin at the theoretical starting point 222A. In these alternative embodiments, the actual starting points will be at the point where the adjacent thread crest or thread trough intersects the front cutting face 202.

Figure 16:
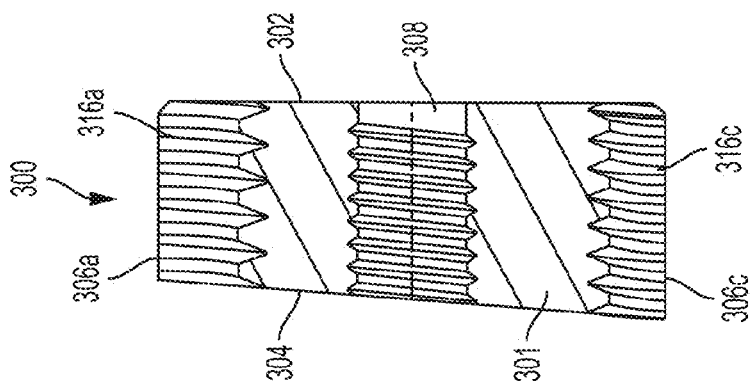
FIG. 16 is a cross-sectional side view of a third embodiment of a die for use with a threaded rod cutting machine

Referring to FIG. 16, in an alternative embodiment, a die 300 may include a body 301 having a front cutting face 302, a rear face 304, and a plurality of side faces 306a, 306c extending between the front cutting face 302 and the rear face 304. Each of the side faces 306a, 306c define a threaded annular recess 316a, 316c for receiving a threaded rod. A partially threaded central bore 308 extends through the body 301. The die 300 differs from the die 100 in that the rear face 304 is transverse to the front cutting face 302. Thus, the die 300 has a non-prismatic polyhedral shape.

Figure 18:
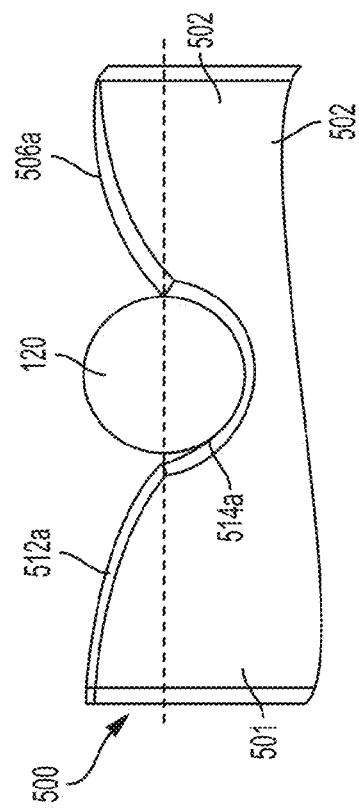
FIG. 18 is a side view of a portion of a fifth embodiment of a die for use with a threaded rod cutting machine.
Figure 17:
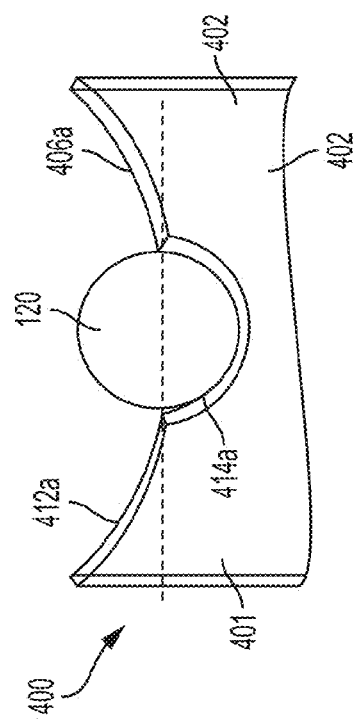
FIG. 17 is a side view of a portion of a fourth embodiment of a die for use with a threaded rod cutting machine.

Referring to FIGS. 17 and 18, in two other alternative embodiments dies 400 and 500 each have a body 401, 501 with a front cutting face 402, 502, a rear face (not shown), and at least one side face 406a, 506a extending between the front cutting face 402, 502 and the rear face. The side faces 406a, 506a each define a threaded arcuate recess 414a, 514a configured to receive a threaded rod 120. Each die 400, 500 has a cutting edge 412a, 512a at the junction between the front cutting face 402, 502 and the side face 406a, 506a. The dies 400, 500 differ from the die 100 in that the side faces 406a, 506a and the cutting edges 412a, 512a are curved instead of straight such that the dies 400, 500 have a curved polyhedral shape. In particular, the side face 406a and cutting edge 412a of die 400 has a concave curvature, while the side face 506a and cutting edge 512a of the die 500 has a convex curvature.

Figure 19:
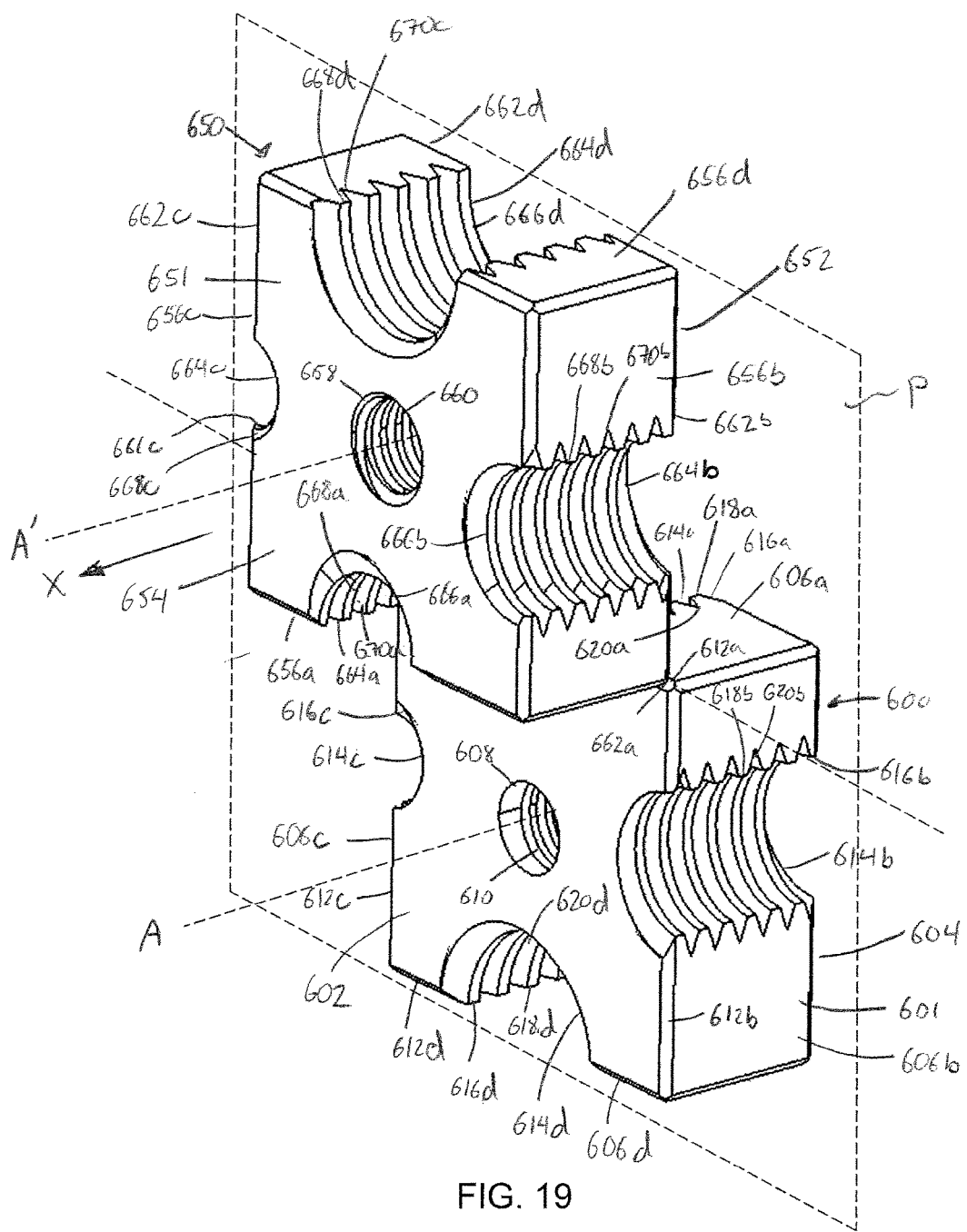
FIG. 19 is a perspective view of a sixth embodiment of dies for use with a threaded rod cutting machine.

Referring to FIG. 19, in another embodiment, a set of dies includes a first stationary die 600 and a second moveable die 650. Each die 600, 650 has a body 601, 651 with a generally polyhedral shape, e.g., a square or rectangular prismatic shape. Each die 600, 650 has a front cutting face 602, 652 and a rear face 604, 654 that are generally parallel to each other. A plurality of side faces 606a-606d and 656a-656d (e.g., four side faces) extend between each front face 602, 652 and each rear face 604, 654, substantially perpendicular to the front face 602, 652 and to the rear face 604, 654. Each die 600, 656 has cutting edges 612a-612d and 662a-662d at the edges defined by the junctions between the side faces 606a-606d, 656a-656d and each front cutting face 602, 652. To obtain a clean cut of a threaded rod, the front cutting faces 602, 652 of the dies 600, 650 substantially lie in a common cutting plane P so that the front cutting faces do not overlap and are not substantially spaced apart. When cutting the moveable die 652 tends to be forced slightly away from the stationary die 602 in a direction X that is perpendicular to the plane P and parallel to the threaded rod so that the dies 602, 652 do not abut with and interfere with one another.

Each of the side faces 606a-606d and 652a-652d defines an arcuate recess 614a-614d and 664a-664d for receiving a threaded rod. Each arcuate recess 614a-614d and 664a-664d has a partially cylindrical shape (e.g., half of a cylinder) that extends from the front face 602, 652 to the rear face 604, 654, and is threaded along its length by a thread 616a-616d and 666a-666d. Each thread 616a-616d and 666a-666d includes a series of crests 618a-618d and 668a-668d and troughs 620a-620d and 670a-670d. The radius of each recess 614a-614d and 664a-664d is sized to receive a threaded rod of a corresponding diameter, while the pitch and size of the thread 616a-616d and 666a-666d is configured to correspond to a pitch and size of the thread on the threaded rod to be cut. In an embodiment, one or more of the recesses 614a-614d and 664a-664d may have different sizes and/or thread pitches to accommodate different sized or configured threaded rods. Thus, the dies 600, 650 can be rotated and mounted at different angular positions on the stationary arm 79 and the lever arm 74 in order to cut a plurality of different sized threaded rods, as described above.

Each die 600 also has a fastener receiver (e.g., a through bore 608, 658) that is configured to be coupled to a fastener (e.g., mounting bolts 75, 77) on the threaded rod cutting machine. Each bore 608, 658 extends through a center of the body 601, 651 from the front face 602, 652 to the rear face 604, 654 along a center axis A, A' that is substantially perpendicular to the front face 602, 652 and to the rear face 604, 654. Each bore 608, 658 is partially threaded by a thread 610, 660 that starts at the rear face 604, 654 but that terminates before reaching the front face 602, 652. Because of this partial thread, the threaded mounting bolts 75, 77 on the arms 74, 79 can only be inserted in one direction through each die 600, 650, starting at the rear face 604, 654 of each die 600, 650. Thus, the dies 600, 650 can only be installed in the threaded cutting tool with their rear faces 604, 654 facing their respective arms 72, 79. This prevents the dies 600, 650 from inadvertently being installed backwards on the arms 72, 79.

Figure 20A:
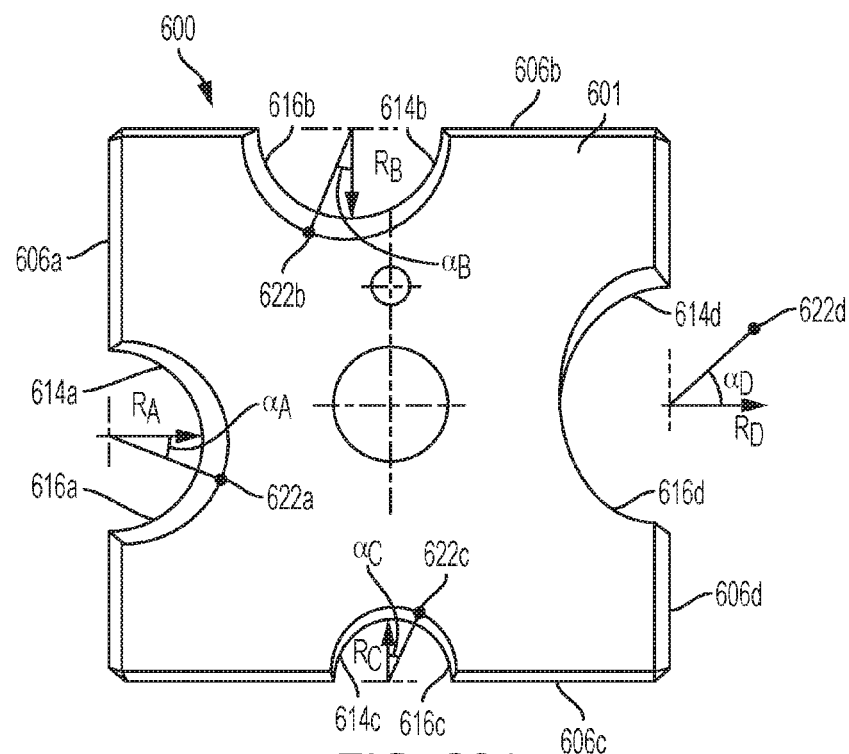
FIGS. 20A and 20B are side views of the dies of FIG. 19.
Figure 20B:
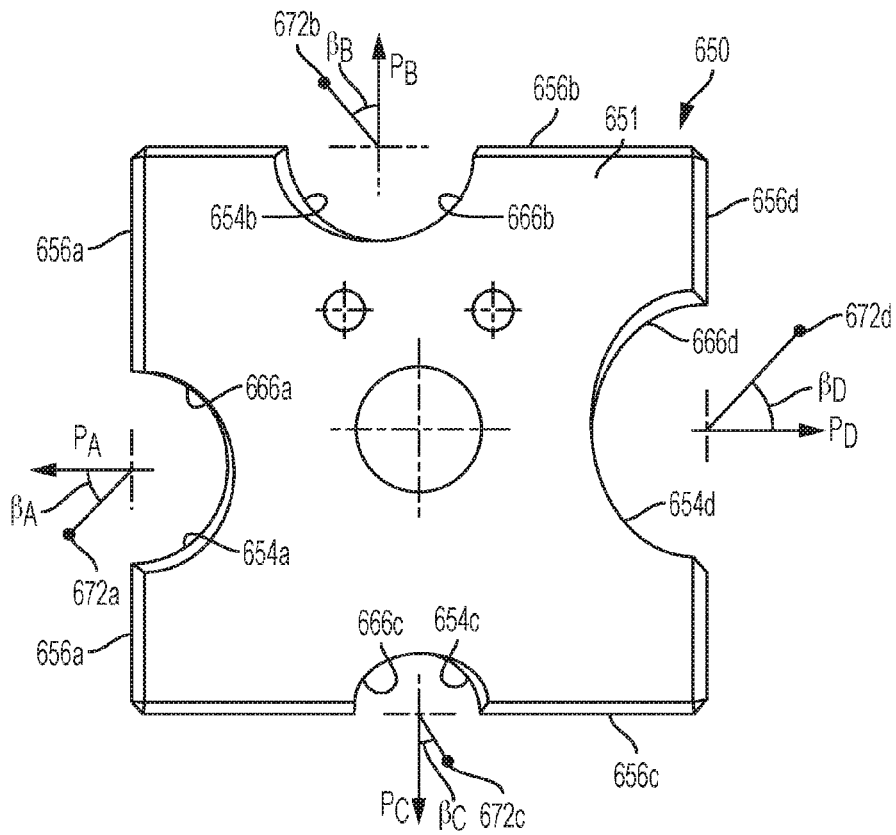

Referring also to FIGS. 20A and 20B, the first trough 620a-620d of each thread 616a-616d of the stationary die 600 has a starting point 622a-622d where the first trough 620a-620d intersects a plane of the front face 602. It should be noted that some of the starting points (e.g., 622d) may be theoretical starting points located away from the actual arcuate recess 614a-614d. Each thread 616a-616d extends from the starting point 622a-622d in a clockwise direction toward the corresponding side face 606a-606d. Each starting point 622a-622d can be identified by an angle $\alpha_A$-$\alpha_D$ measured relative to a radius Ra-Rd that bisects the corresponding recess 614a-614d. The first trough 670a-670d of each thread 666a-666d of the moveable die 650 has a starting point 672a-672d where the first crest 668a-668d intersects a plane of the front face 652. In the disclosed embodiment, the starting points are theoretical starting points located away from the actual arcuate recess 654a-654d, but that is not required. Each thread 666a-666d extends from the starting point 672a-672d in a clockwise direction toward the corresponding side face 656a-656d. Each starting point 672a-672d can be identified by an angle $\beta_A$-$\beta_D$ measured relative to measured relative to a radius Pa-Pd that bisects the corresponding recess 614a-614d.

Figure 21B:
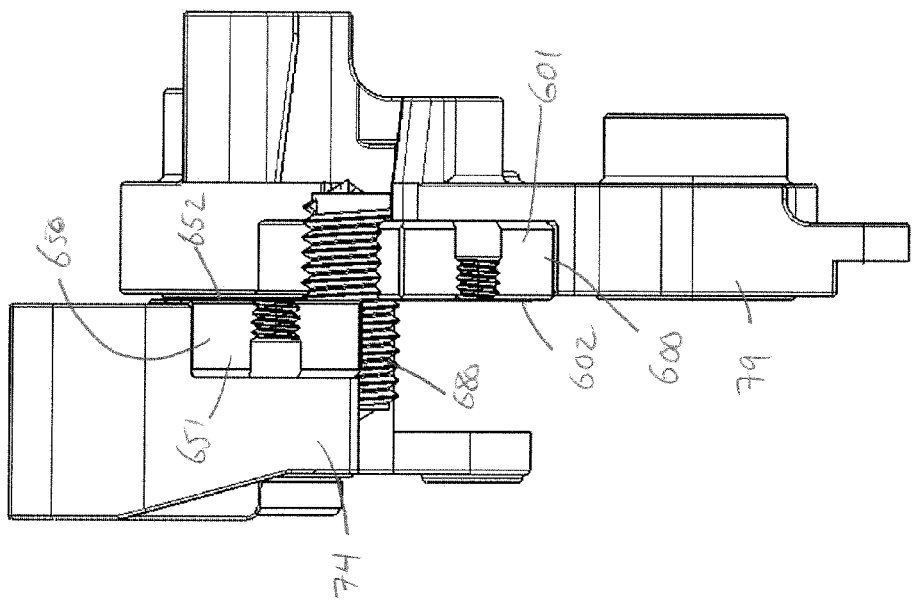
FIGS. 21A and 21B are side views of the dies of FIG. 19 being used with a threaded rod cutting machine.
Figure 21A:
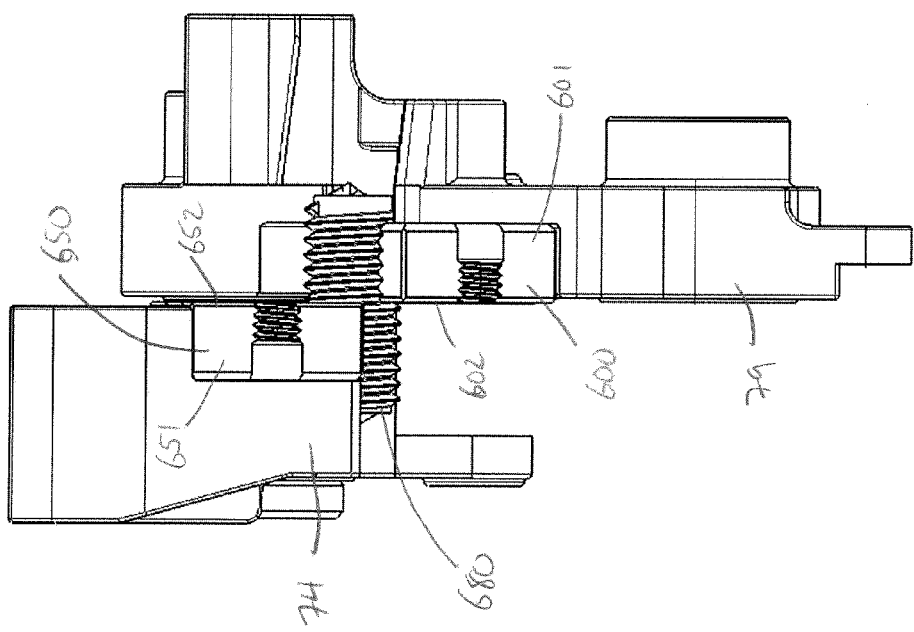
Figure 22A:
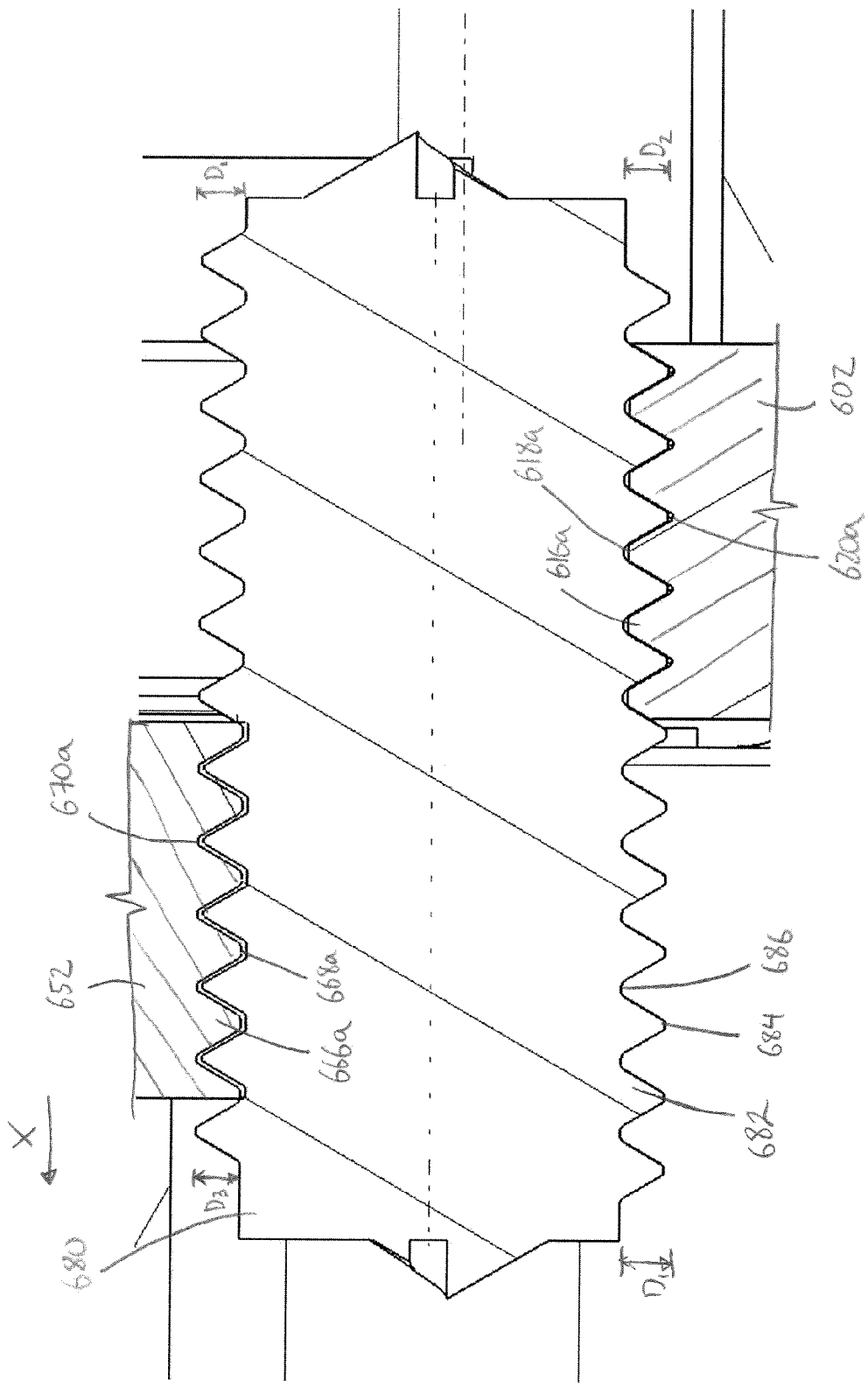
FIGS. 22A and 22B are cross-sectional views of the dies of FIG. 19 being used to cut a threaded rod in a threaded die cutting machine.

Referring also to FIGS. 21A and 22A, for each of the three smaller diameter (e.g., less than ½ inch) recesses 614a-614c and 654a-654c, the starting points 622a-622c and 672a-672c of the threads 616a-616c and 666a-666c are arranged so that the helical paths traced by the threads 616a-616c of the stationary die 602 and the threads 666a-666c of the moveable die 652 are as close as possible to continuous. In order to trace a continuous helical path, the starting points 622a-622c of the smaller diameter threads 616a-616c on the stationary die 602 are selected to almost coincide with the starting points 672a-627c of the smaller diameter threads 666a-666c on the moveable die 652 when the moveable die 652 has been inverted, coupled to the arm 74, and closed on the threaded rod. In one example, the starting points 622a-622c of the smaller diameter threads 616a-616c on the stationary die 602 are positioned at acute angles $\alpha_A$-$\alpha_C$ (e.g., approximately 10°-30°) relative to a radius Ra-Rc that extends inward from the side face 606a-606c and bisects the recess 614a-614c, while the starting points 672a-672c of the smaller diameter threads 666a-666c on the moveable die 652 are positioned at acute angles $\beta_A$-$\beta_C$ (e.g., approximately 30°-50°) relative to a radius Pa-Pc that extends outward from the side face 656a-656c and bisects the recess 654a-654c. When the dies 602, 652 are closed about a threaded rod 680, the crests 618a-618c and troughs 620a-620c of the smaller diameter threads 616a-616c on the stationary die 602 and the crests 668a-668c and troughs 670a-670c of the threads all engage the crests 684 and troughs 686 of the thread 682 on the threaded rod 680. In addition, the thread depth D2, D3 of the threads 616a-616c and 666a-666c is substantially the same as the thread depth D1 of the threaded rod 680. As the dies 602, 652 start to shear the threaded rod 680, the moveable die 652 is biased slightly away from the stationary die in a direction X parallel to the threaded rod 680 so that the dies 602, 652 do not interfere with one another during cutting.

Figure 22B:
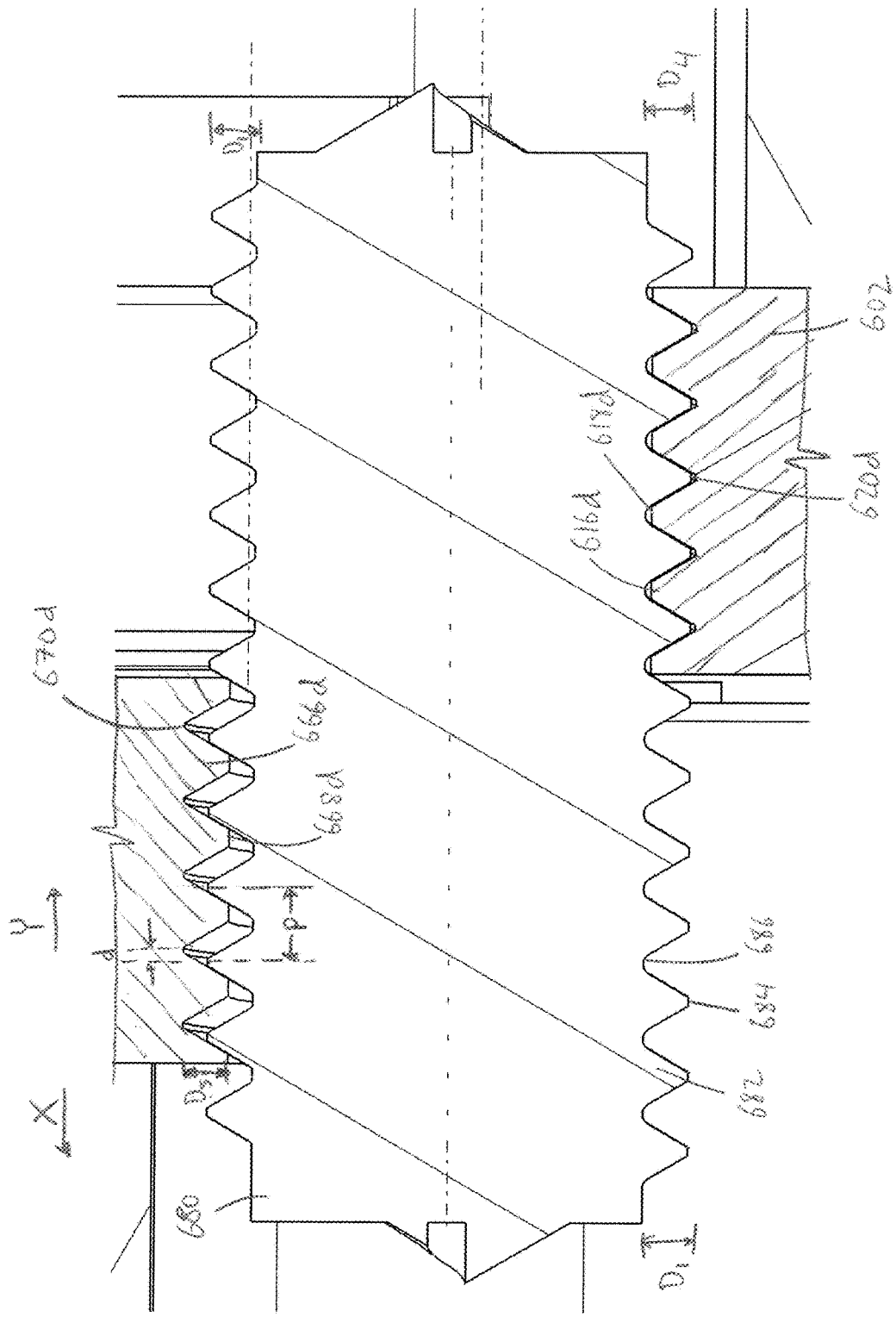

Referring also to FIGS. 21B and 22B, when cutting larger diameter threaded rods (e.g., ½ inch and greater), the threaded rod cutting machine exerts a greater force biasing the moveable die 652 away from the stationary die 602 in the direction X along the threaded rod 680, resulting in poor cut quality with burrs on the cut surface. To counteract this biasing force, the starting points 622d and 672d of the threads 616d and 666d on the dies 602, 606 are arranged so that the helical paths traced by the thread 622d of the stationary die 602 and the thread 666d of the moveable die 652 are discontinuous. The starting point 622d of the larger diameter thread 616d on the stationary die 602 is selected to not coincide with the starting point 672d of the larger diameter thread 666d on the moveable die 652. In one example, the starting point 622d of the larger diameter thread 616d on the stationary die 602 is positioned at an acute angle $\alpha_D$ (e.g., approximately 45°-65°) relative to a radius Rd that extends outward from the side face 606d and bisects the recess 614d, while the starting point 672d of the larger diameter thread 666d on the moveable die 652 is positioned at an angle $\beta_D$ (e.g., approximately 45°-65°) relative to a radius Pd that extends outward from the side face 656d and bisects the recess 654d. The angles $\alpha_D$ and $\beta_D$ may be (although are not required to be) approximately equal to each other so that the dies 602, 652 are reversible. When the dies 602, 652 are closed about a threaded rod 680, the crests 618d and troughs 620d of the larger diameter thread 616d on the stationary die 602 engage the crests 684 and troughs 686 of the thread 682 on the threaded rod 680, but the crests 668d and troughs 670d of the thread 666d on the moveable die 652 are offset from the crests 684 and troughs 686 of the thread 682 on the threaded rod 680 in a direction Y (opposite to direction X) parallel to the threaded rod 680. The offset distance d is less than the pitch p of the thread 682 of the threaded rod 608. This offset causes the moveable die 652 to be biased in the direction Y to counteract the biasing force exerted by the threaded rod cutting machine in the direction X, resulting in a cleaner cut. In addition, the thread depths D4, D5 of the thread 616d and the thread 666d are substantially the same as the thread depth D1 of the threaded rod 680.

Figure 23B:
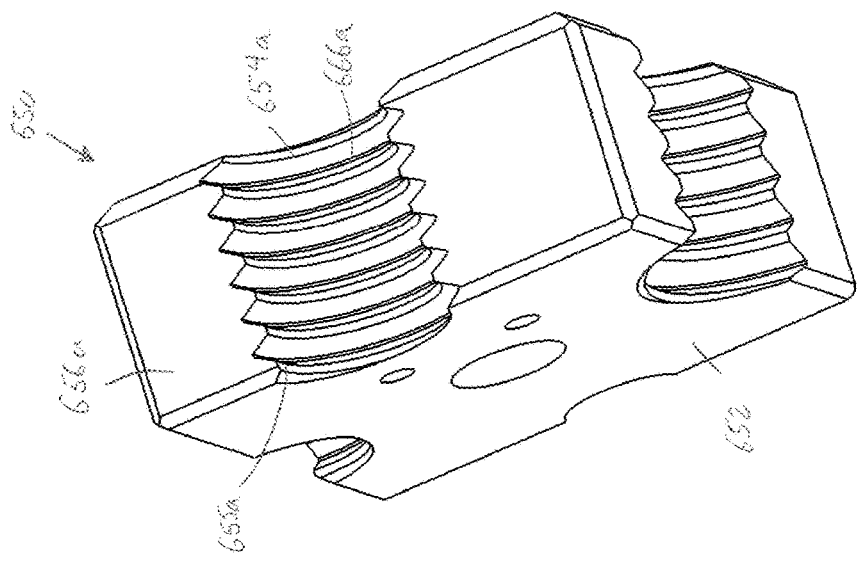
FIGS. 23A and 23B are close-up perspective views of one set of threaded recesses of the dies of FIG. 19.
Figure 23A:
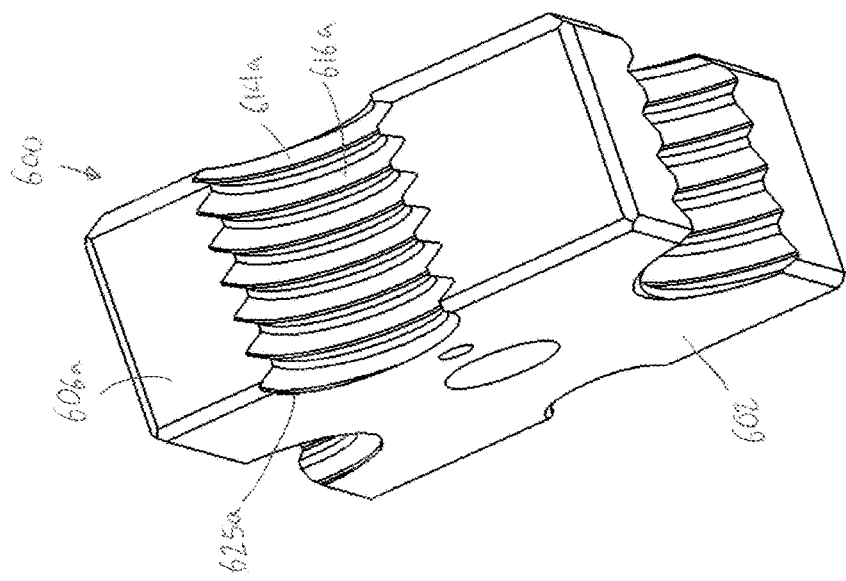
Figure 24A:
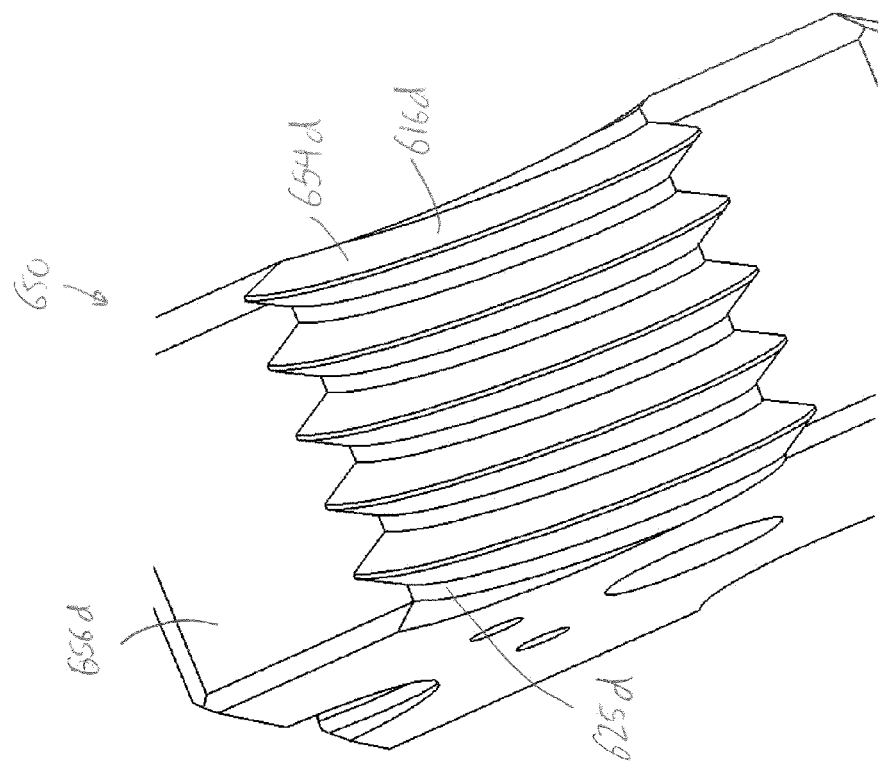
FIGS. 24A and 24B are close-up perspective views of another set of threaded recesses of the dies of FIG. 19.
Figure 24B:
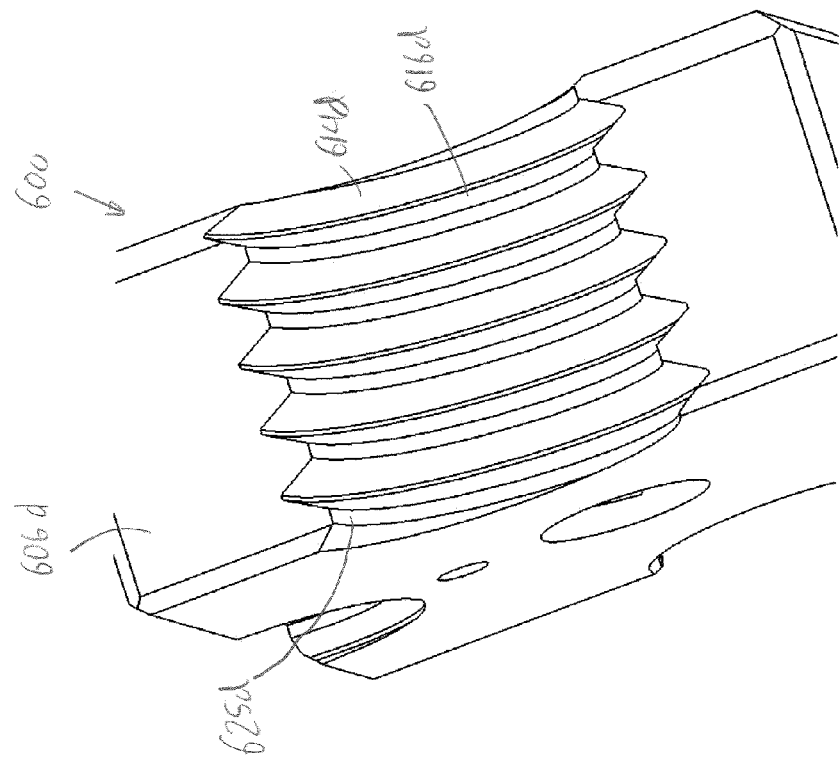

A beneficial byproduct of making the threads of the moveable die offset from the threads on the threaded rod is that it enables the first thread on both dies to be thicker. As shown in FIGS. 23A-23B, for the smaller diameter recesses 614a and 654a, the starting point 622a of the thread 616a on the stationary die 600 results in a very thin first thread 625a, while the starting point 672a of the thread 666a on the moveable die 650 results in much thicker first thread 655a. The thinner first thread 625a on the stationary die 600 is believed to contribute to reduced die life. However, it is not possible to have both first threads be thick and still have both dies be aligned with the threads on the threaded rod so that the helical paths traced by both threads are continuous. In contrast, as shown in FIGS. 24A-24B, for the larger diameter recesses 614d and 654d, the starting points 622d, 672d of the threads 616d, 666d on both the stationary die 600 and the moveable die 650 result in both dies having a relatively thick first thread 625d, 655d. This thicker first thread on both dies is achievable only because the moveable die is offset from the threads on the threaded rod and discontinuous from the thread on the stationary die.

Having thicker first threads 625d, 655d on both dies results in a significant, and unexpected, increase in the life of both dies (especially the moveable die) as compared to dies that do not have thicker first threads on both dies. As shown in the below table, the number of cuts that can be performed using dies having a thicker first thread on both dies is dramatically greater than the number of cuts that can be performed using dies where only one die has a thicker first thread. The following table shows the results of nine samples of each set of dies, used to cut ½ inch threaded rod using the threaded rod cutting machine described above.

| Sample | Single Die Has Thicker First Thread (# cuts) | Both Dies Have Thicker First Thread (# cuts) |
| --- | --- | --- |
| 1 | 300 | 4250 |
| 2 | 520 | 4600 |
| 3 | 680 | 4850 |
| 4 | 700 | 3900 |
| 5 | 710 | 4400 |
| 6 | 750 | 7200 |
| 7 | 1180 | 7200 |
| 8 | 1780 | 8150 |
| 9 | 820 | 4900 |
| Avg. | 827 | 5294 |

As shown in the above table, a design with both dies having a thicker first thread resulted in an increased die life, on average, of approximately 6.6 times as compared to a design with only a single die having a thicker first thread. This increase was a significant and unexpected byproduct of offsetting the moveable die to improve the cut quality.

Numerous modifications may be made to the exemplary implementations described above. For example, the dies can have different shapes, such as having one or more faces and or edges being curved and/or non-parallel. In addition, the dies can have a different number or configuration of side faces (e.g., a hexagonal prism, a pentagonal prism, a triangular prism, a pyramid). The arcuate recesses in the dies may have the same or different sizes and thread pitches. These and other implementations are within the scope of the following claims.

What is claimed is:

1. A threaded rod cutting machine comprising:
   a housing;
   a first arm and a second arm coupled the housing, at least one of the first and second arms being moveable relative to the other of the first and second arms to shear a threaded rod;
   a first cutting die mountable to the first arm, the first die having a first body with a first front face, a first rear face, a first side face extending between the first front face and the first rear face, and a first threaded arcuate recess with a first thread defined in the first side face and configured to engage a portion of the threaded rod, the first thread defining a first helical path relative to a fixed point on the housing when the first die is mounted to the first arm and engages the threaded rod; and
   a second cutting die mountable to the second arm, the second die having a second body with a second front face, a second side face extending between the second front face and the second rear face, and a second threaded arcuate recess with a second thread defined in the second side face and configured to engage a portion of the threaded rod, the second thread defining a second helical path relative to the fixed point on the housing when the second die is mounted to the second arm and engages the threaded rod,
   wherein, when the first and second dies engage the threaded rod, crests and troughs of the second helical path are axially offset from crests and troughs of the first helical path so that crests and troughs of the first thread are aligned with troughs and crests of a thread on the threaded rod and crests and troughs of the second thread are misaligned with the troughs and crests of the thread on the threaded rod.

2. The machine of claim 1, wherein the crests and troughs of the second thread are configured to bias the second die toward the first die when cutting the threaded rod.

3. The machine of claim 1, wherein the first thread has a first trough starting point in a plane of the first front face and the second thread has a second trough starting point in a plane of the second front face, the first and second trough starting points located such that the first helical path and the second helical path are discontinuous when the first and second dies engage the threaded rod.

4. The machine of claim 3, wherein the first trough starting point is located at a first acute angle in a counter-clockwise direction relative to a first radius that extends outward from the first side face and bisects the first recess, and the second starting point is located at a second acute angle in a counter-clockwise direction relative to a second radius that extends outward from the second side face and bisects the second recess.

5. The machine of claim 4, wherein the first angle is approximately equal to the second angle so that the first die is interchangeable with the second die.

6. The machine of claim 5, wherein the first angle and the second angle are each approximately 50° to approximately 60°.

7. The machine of claim 1, wherein the first arm is stationary and the second arm is moveable relative to the housing while cutting the threaded rod.

8. The machine of claim 1, wherein
the first die further comprises a third side face extending between the first front face and the first rear face, and a third threaded arcuate recess with a third thread defined in the third side face and configured to receive a second threaded rod to be cut, wherein crests and troughs of the third thread are aligned with troughs and crests of a thread of the second threaded rod when the first die engages the second threaded rod; and
the second die further comprises a fourth side face extending between the second front face and the second rear face, and a fourth threaded arcuate recess with a fourth thread defined in the fourth side face and configured to receive the second threaded rod, wherein crests and troughs of the fourth thread are aligned with the troughs and crests of the thread of the second threaded rod when the second die engages the second threaded rod.

9. The machine of claim 8, wherein the third arcuate recess and the fourth arcuate recess each have a diameter less than a diameter of the first arcuate recess and the second arcuate recess.

10. The machine of claim 8, wherein the third thread has a third trough starting point in a plane of the third front face and the fourth thread has a fourth trough starting point in a plane of the second front face, the third and fourth trough starting points located such that the third and fourth threads form a continuous helical path when the third and fourth recesses are closed around the second threaded rod.

11. The machine of claim 10, wherein the third trough starting point is located at a third acute angle in a clockwise direction relative to a third radius that extends outward from the third side face and bisects the third recess, and the fourth starting point is located at a fourth acute angle in a counter-clockwise direction relative to a fourth radius that extends outward from the fourth side face and bisects the fourth recess.

12. A threaded rod cutting machine comprising:
a housing;
a first arm and a second arm coupled the housing, at least one of the first and second arms being moveable relative to the other of the first and second arms to shear a threaded rod;
a first cutting die mountable to the first arm, the first die having a first body with a first front face, a first rear face, a first side face extending between the first front face and the first rear face, and a first threaded arcuate recess with a first thread defined in the first side face and configured to engage a portion of the threaded rod, the first thread defining a first helical path relative to a fixed point on the housing when the first die is mounted to the first arm and engages the threaded rod; and
a second cutting die mountable to the second arm, the second die having a second body with a second front face, a second side face extending between the second front face and the second rear face, and a second threaded arcuate recess with a second thread defined in the second side face and configured to engage a portion of the threaded rod, the second thread defining a second helical path relative to the fixed point on the housing when the second die is mounted to the second arm and engages the threaded rod,
wherein, when the first and second dies engage the threaded rod, the first helical path and the second helical path are discontinuous so that crests and troughs of the first thread are aligned with troughs and crests of a thread on the threaded rod and crests and troughs of the second thread are misaligned with the troughs and crests of the thread on the threaded rod.

13. The machine of claim 12, wherein the second thread is configured to bias the second die toward the first die when cutting the threaded rod.

14. The machine of claim 12, wherein the first thread has a first starting point in a plane of the first front face and the second thread has a second starting point in a plane of the second front face, the first and second starting points located such that the first and second threads form the discontinuous helical path when the first and second dies engage the threaded rod.

15. The machine of claim 14, wherein the first trough starting point is located at a first acute angle in a counter-clockwise direction relative to a first radius that extends outward from the first side face and bisects the first recess, and the second starting point is located at a second acute angle in a counter-clockwise direction relative to a second radius that extends outward from the second side face and bisects the second recess.

16. The machine of claim 15, wherein the first angle is approximately equal to the second angle so that the first die is interchangeable with the second die.

17. The machine of claim 12, wherein the first arm is stationary and the second arm is moveable relative to the housing while cutting the threaded rod.

18. The machine of claim 12, wherein
the first die further comprises a third side face extending between the first front face and the first rear face, and a third threaded arcuate recess with a third thread defined in the third side face and configured to receive a second threaded rod to be cut;
the second die further comprises a fourth side face extending between the second front face and the second rear face, and a fourth threaded arcuate recess with a fourth thread defined in the fourth side face and configured to receive the second threaded rod; and
the third thread has a third starting point at the first front face and the fourth thread has a fourth starting point at the second front face, the third and fourth starting points located such that the third and fourth threads form a continuous helical path when the third and fourth recesses engage the second threaded rod.

19. The machine of claim 18 wherein crests and troughs of the third thread are aligned with the troughs and crests of a thread of the second threaded rod when the first die engages the second threaded rod, and crests and troughs of the fourth thread are aligned with troughs and crests of the thread of the second threaded rod when the second die engages the second threaded rod.

20. The machine of claim 18, wherein the second threaded rod, the third arcuate recess and the fourth arcuate recess each have a diameter less than a diameter of the first arcuate recess and the second arcuate recess.

* * * * *